US011716256B2

(12) United States Patent
Li et al.

(10) Patent No.: US 11,716,256 B2
(45) Date of Patent: Aug. 1, 2023

(54) INTENT EXECUTION METHOD AND APPARATUS

(71) Applicant: HUAWEI TECHNOLOGIES CO., LTD., Guangdong (CN)

(72) Inventors: Xianming Li, Shanghai (CN); Dong Li, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/744,099

(22) Filed: May 13, 2022

(65) Prior Publication Data
US 2022/0272002 A1 Aug. 25, 2022

Related U.S. Application Data

(63) Continuation of application No. PCT/CN2020/128178, filed on Nov. 11, 2020.

(30) Foreign Application Priority Data

Nov. 15, 2019 (CN) .......................... 201911122068.6

(51) Int. Cl.
G06F 15/173 (2006.01)
H04L 41/18 (2022.01)
(Continued)

(52) U.S. Cl.
CPC .............. H04L 41/18 (2013.01); H04L 41/28 (2013.01); H04L 41/5022 (2013.01); H04W 48/18 (2013.01)

(58) Field of Classification Search
CPC ..... H04L 41/18; H04L 41/28; H04L 41/5022; H04L 41/5019; H04L 41/0866;
(Continued)

(56) References Cited

U.S. PATENT DOCUMENTS

2005/0010659 A1* 1/2005 Gonguet ............. H04L 41/0894
709/223
2016/0099883 A1* 4/2016 Voit ........................ H04L 45/28
709/226
(Continued)

FOREIGN PATENT DOCUMENTS

CN 102334360 A * 1/2012 ............ H04W 48/16
CN 102334360 A 1/2012
(Continued)

OTHER PUBLICATIONS

3GPP TR 28.812 V0.8.0 (Oct. 2019), "3rd Generation Partnership Project; Technical Specification Group Services and System Aspects; Telecommunication management; Study on scenarios for Intent driven management services for mobile networks (Release 16)," Oct. 2019, 41 pages.
(Continued)

Primary Examiner — Richard G Keehn
(74) Attorney, Agent, or Firm — Fish & Richardson P.C.

(57) ABSTRACT

The present disclosure relates to intent execution methods and apparatus. In one example method, an element management system (EMS) receives a first intent from a network management system (NMS). The first intent indicates the EMS to execute a first command on a first network element and execute a second command on a second network element, a second intent in an active state is maintained in the EMS, the second intent indicates the EMS to execute a third command on the first network element, and the first command and the third command are mutually exclusive. The EMS receives a first parameter and conflict policy information. The EMS determines whether to execute the second command on the second network element, and executes the first command or the third command on the first network element based on the conflict policy information.

20 Claims, 11 Drawing Sheets

(51) Int. Cl.
*H04L 41/28* (2022.01)
*H04L 41/5022* (2022.01)
*H04W 48/18* (2009.01)

(58) Field of Classification Search
CPC .. H04L 41/0894; H04W 24/02; H04W 48/18; H04W 28/04
See application file for complete search history.

(56) References Cited

U.S. PATENT DOCUMENTS

| | | | | |
|---|---|---|---|---|
| 2017/0288952 | A1* | 10/2017 | Clark | H04L 41/0893 |
| 2018/0278481 | A1* | 9/2018 | Prasad | G06F 8/61 |
| 2020/0178093 | A1 | 6/2020 | Peng et al. | |

FOREIGN PATENT DOCUMENTS

| | | | | | |
|---|---|---|---|---|---|
| CN | 102468970 | A | * | 5/2012 | |
| CN | 102468970 | A | | 5/2012 | |
| CN | 102724076 | A | * | 10/2012 | |
| CN | 102724076 | A | | 10/2012 | |
| CN | 104104615 | A | * | 10/2014 | H04L 41/0893 |
| CN | 104104615 | A | | 10/2014 | |
| CN | 104956624 | A | | 9/2015 | |
| CN | 109495907 | A | | 3/2019 | |
| CN | 109495907 | A | * | 3/2019 | H04W 24/02 |
| CN | 110247783 | A | * | 9/2019 | |
| CN | 110247783 | A | | 9/2019 | |
| EP | 3754905 | A1 | * | 12/2020 | G06F 16/9024 |
| WO | WO-0199251 | A1 | * | 12/2001 | H04L 41/16 |
| WO | 2014086509 | A1 | | 6/2014 | |
| WO | WO-2014086509 | A1 | * | 6/2014 | H04L 41/022 |

OTHER PUBLICATIONS

Broadband Forum, "WT-134 Broadband Policy Control Framework (PCF)," TSG SA Meeting #53, SP-110450, Fukuoka, Japan, Sep. 19-21, 2011, 158 pages.
Huawei, "Reorganize clause 5 to categorize the scenarios," 3GPP TSG-SA5 Meeting #123, S5-191120, Montreal, Canada, Jan. 21-25, 2019, 8 pages.
Office Action issued in Chinese Application No. 201911122068.6 dated Dec. 30, 2021, 11 pages (with English translation).
PCT International Search Report and Written Opinion issued in International Application No. PCT/CN2020/128178 dated Feb. 18, 2021, 16 pages (with English translation).
China Telecommunications et al., "New WI Proposal for GR Intent Aware Network Autonomy," ETSI Draft, Apr. 8, 2019, 10 pages.
Extended European Search Report in European Appln No. 20888467.6, dated Dec. 22, 2022, 10 pages.

* cited by examiner

INTENT EXECUTION METHOD AND APPARATUS

CROSS-REFERENCE TO RELATED APPLICATIONS

This application is a continuation of International Patent Application No. PCT/CN2020/128178, filed on Nov. 11, 2020, which claims priority to Chinese Patent Application No. 201911122068.6, filed on Nov. 15, 2019. The disclosures of the aforementioned applications are hereby incorporated by reference in their entireties.

TECHNICAL FIELD

This application relates to the field of network technologies, and in particular, to an intent execution method and apparatus.

BACKGROUND

Currently, research on intent driven management (intent driven management, IDM) is started in stand alone (stand alone, SA) 5 of the 3rd generation partnership project (3rd generation partnership project, 3GPP), A main idea of the IDM is to generate a network management intent in a network management system (network management system, NMS). The network management intent is used to indicate an effect that the NMS expects a network to achieve (for example, a percentage of users whose data rate is less than 5 Mbps is less than 1%). However, how to implement the network management intent is not involved. The NMS may send the network management intent to an element management system (element management system, EMS). The EMS determines a command of the network management intent based on the network management intent, and executes the command of the network management intent. There may be a plurality of network management intents in different states in the EMS. For example, there may be a plurality of network management intents in an active state and a plurality of network management intents in an inactive state in the EMS.

A command 1 of the network management intent on a network element conflicts with a command 2 of a network management intent 1 (where the network management intent 1 is a network management intent in an active state in the EMS) on the network element. For example, the command 1 is that a user downlink rate is not less than 1 Gbps, and the command 2 is that the user downlink rate is not greater than 500 Mbps. In this case, the EMS either executes the network management intent (or the network management intent 1), or does not execute the network management intent (or the network management intent 1). Consequently, an intent execution manner is not flexible, and user experience is deteriorated.

SUMMARY

Embodiments of this application provide an intent execution method and apparatus, so that a first intent may be partially executed when the first intent conflicts with a second intent. This improves intent execution flexibility and user experience.

To achieve the foregoing objectives, embodiments of this application use the following technical solutions.

According to a first aspect, an embodiment of this application provides an intent execution method. The method includes: An element management system EMS receives a first intent from a network management system NMS, where the first intent is used to indicate the EMS to execute a first command on a first network element and execute a second command on a second network element, a second intent in an active state is maintained in the EMS, the second intent is used to indicate the EMS to execute a third command on the first network element, and the first command and the third command are mutually exclusive. The EMS receives a first parameter and conflict policy information from the NMS. The EMS determines, based on the first parameter and the conflict policy information, whether to execute the second command on the second network element. The EMS executes the first command or the third command on the first network element based on the conflict policy information.

According to the method provided in the first aspect, the EMS may receive the first intent, the first parameter, and the conflict policy information from the NMS, determine, based on the first parameter and the conflict policy information, whether to execute the second command on the second network element, and execute the first command or the third command on the first network element based on the conflict policy information, so that the EMS may partially execute the first intent when an intent conflict occurs. This improves intent execution flexibility and user experience. In addition, when the EMS partially executes the first intent, the EMS may not need to translate the first intent into another command that is not mutually exclusive with the third command. This simplifies a management operation of the EMS.

With reference to the first aspect, in a first possible implementation, the conflict policy information includes one or more of the following policies: policy 1: determining that, in conflicting intents, an intent having a higher priority is an intent that the EMS preferentially meets; policy 2: determining that, in conflicting intents, an intent first received by the EMS or an intent subsequently received by the EMS is an intent that the EMS preferentially meets; or policy 3: determining that, in conflicting intents, an intent having a larger scope or an intent having a smaller scope is an intent that the EMS preferentially meets. According to the foregoing method, the EMS may determine, according to the foregoing policy 1, policy 2, or policy 3 and the first parameter, whether to execute the second command on the second network element, and execute the first command or the third command on the first network element according to the foregoing policy 1, policy 2, or policy 3, so that the EMS may partially execute the intent when the intent conflict occurs. This improves the intent execution flexibility and user experience.

With reference to the first possible implementation of the first aspect, in a second possible implementation, if the intent that the EMS preferentially meets is the second intent, and the first parameter indicates that the EMS is allowed to execute the second command on the second network element, that the EMS determines, based on the first parameter and the conflict policy information, whether to execute the second command on the second network element includes: The EMS executes the second command on the second network element. According to the foregoing method, if the intent that the EMS preferentially meets is the second intent, and the first parameter indicates that the EMS is allowed to execute the second command on the second network element, the EMS may execute the second command on the second network element, so that both the first intent and the second intent can be fulfilled. This improves the intent execution flexibility and user experience. In addition, when the EMS partially executes the first intent, the EMS may not need to translate the first intent into another command that is not mutually exclusive with the third command. This simplifies the management operation of the EMS.

With reference to the first aspect and the possible implementations of the first aspect, in a third possible implementation, if the intent that the EMS preferentially meets is the second intent, that the EMS executes the first command or the third command on the first network element based on the conflict policy information includes: The EMS executes the third command on the first network element. According to the foregoing method, if the intent that the EMS preferentially meets is the second intent, the EMS may execute the third command on the first network element, so that the EMS may execute the second intent and partially execute the first intent when the intent conflict occurs. This improves the intent execution flexibility and user experience. In addition, when the EMS partially executes the first intent, the EMS may not need to translate the first intent into another command that is not mutually exclusive with the third command. This simplifies the management operation of the EMS.

With reference to the first aspect and the first possible implementation of the first aspect, in a fourth possible implementation, if the intent that the EMS preferentially meets is the first intent, the EMS determines, based on the first parameter and the conflict policy information, whether to execute the second command on the second network element includes: The EMS executes the second command on the second network element. That the EMS executes the first command or the third command on the first network element based on the conflict policy information includes: The EMS executes the first command on the first network element. According to the foregoing solutions, if the intent that the EMS preferentially meets is the first intent, the EMS may execute the first command on the first network element, and execute the second command on the second network element, so that the EMS can determine the commands on the first network element and the second network element when the intent conflict occurs.

With reference to the fourth possible implementation of the first aspect, in a fifth possible implementation, the second intent is further used to indicate the EMS to execute a fourth command on a third network element. The method further includes: The EMS cancels the second intent based on the second parameter, where the second parameter indicates that the EMS is not allowed to execute the fourth command on the third network element. According to the foregoing method, if the intent that the EMS preferentially meets is the first intent, and the second parameter indicates that the EMS is not allowed to execute the fourth command on the third network element, the EMS may execute the first command on the first network element, execute the second command on the second network element, and cancel the second intent, so that the EMS can determine the commands on the first network element, the second network element, and the third network element when the intent conflict occurs.

With reference to the first aspect and the possible implementations of the first aspect, in a sixth possible implementation, the method further includes: The EMS sends first notification information to the NMS, where the first notification information is used to indicate an execution result of the first intent. According to the foregoing method, the EMS may send the first notification information to the NMS, so that the NMS learns of the execution result of the first intent.

With reference to the first aspect and the possible implementations of the first aspect, in a seventh possible implementation, the method further includes: The EMS sends second notification information to the NMS, where the second notification information is used to indicate an execution result of the second intent. According to the foregoing method, the EMS may send the second notification information to the NMS, so that the NMS learns of the execution result of the second intent.

With reference to the first aspect and the possible implementations of the first aspect, in an eighth possible implementation, the method further includes: The EMS sends intent conflict resolution request information to the NMS, where the intent conflict resolution request information is used to request to determine the intent that the EMS preferentially meets. The EMS receives intent conflict resolution response information from the NMS. The EMS determines, based on the intent conflict resolution response information, the intent that the EMS preferentially meets. According to the foregoing method, when the EMS cannot determine the intent that the EMS preferentially meets, the EMS may send the intent conflict resolution request information to the NMS, receive the intent conflict resolution response information from the NMS, and determine, based on the intent conflict resolution response information, the intent that the EMS preferentially meets, so that the EMS determines the commands of the EMS on the first network element and the second network element based on the intent that the EMS preferentially meets and the first parameter.

With reference to the eighth possible implementation of the first aspect, in a ninth possible implementation, the intent conflict resolution response information includes an identifier of the first intent or an identifier of the second intent. That the EMS determines, based on the intent conflict resolution response information, the intent that the EMS preferentially meets includes: The EMS determines, based on the identifier of the first intent or the identifier of the second intent, the intent that the EMS preferentially meets. According to the foregoing method, the EMS may determine, based on the identifier of the first intent or the identifier of the second intent, the intent that the EMS preferentially meets, so that the EMS determines, based on the intent that the EMS preferentially meets and the first parameter, the commands of the EMS on the first network element and the second network element.

With reference to the eighth possible implementation of the first aspect, in a tenth possible implementation, the intent conflict resolution response information includes updated conflict policy information. That the EMS determines, based on the intent conflict resolution response information, the intent that the EMS preferentially meets includes: The EMS determines, based on the updated conflict policy information, the intent that the EMS preferentially meets. According to the foregoing method, the EMS may determine, based on the updated conflict policy information, the intent that the EMS preferentially meets, so that the EMS determines, based on the intent that the EMS preferentially meets and the first parameter, the commands of the EMS on the first network element and the second network element.

According to a second aspect, an embodiment of this application provides an intent execution method. The method includes: A network management system NMS sends a second intent to an element management system EMS, where the second intent is used to indicate the EMS to execute a third command on a first network element. The NMS sends a first intent to the EMS, where the first intent is used to indicate the EMS to execute a first command on the first network element and execute a second command on a second network element, and the first command and the third command are mutually exclusive. The NMS sends a first parameter and conflict policy information to the EMS, where the first parameter and the conflict policy information are used to determine whether to execute the second command on the second network element, and the conflict policy information is further used to determine to execute the first command or the third command on the first network element.

According to the method provided in the second aspect, the NMS may send the second intent, the first intent, the first parameter, and the conflict policy information to the EMS, so that the EMS can partially execute the first intent or the second intent when the first intent conflicts with the second intent.

With reference to the second aspect, in a first possible implementation, the conflict policy information includes one or more of the following policies: policy 1: determining that, in conflicting intents, an intent having a higher priority is an intent that the EMS preferentially meets; policy 2: determining that, in conflicting intents, an intent first received by the EMS or an intent subsequently received by the EMS is an intent that the EMS preferentially meets; or policy 3: determining that, in conflicting intents, an intent having a larger scope or an intent having a smaller scope is an intent that the EMS preferentially meets. According to the foregoing method, the conflict policy information sent by the NMS to the EMS may include one or more of policy 1, policy 2, or policy 3, so that the EMS may determine, according to the received policy 1, policy 2, or policy 3 and the first parameter, the commands of the EMS on the first network element and the second network element Mien the first intent conflicts with the second intent.

With reference to the second aspect and the first possible implementation of the first aspect, in a second possible implementation, the method further includes: The NMS receives first notification information from the EMS, where the first notification information is used to indicate an execution result of the first intent. According to the foregoing method, the NMS may receive the first notification information from the EMS, to learn of the execution result of the first intent.

With reference to the second aspect and the possible implementations of the first aspect, in a third possible implementation, the method further includes: The NMS receives second notification information from the EMS, where the second notification information is used to indicate an execution result of the second intent. According to the foregoing method, the NMS may receive the second notification information from the EMS, to learn of the execution result of the second intent.

With reference to the second aspect and the possible implementations of the first aspect, in a fourth possible implementation, the method further includes: The NMS receives intent conflict resolution request information from the EMS, where the intent conflict resolution request information is used to request to determine the intent that the EMS preferentially meets. The NMS sends intent conflict resolution response information to the EMS, where the intent conflict resolution response information is used to indicate the intent that the EMS preferentially meets. According to the foregoing method, when the EMS cannot determine the intent that the EMS preferentially meets, the NMS may receive the intent conflict resolution request information from the EMS, and send the intent conflict resolution response information to the EMS, so that the EMS can determine, based on the intent conflict resolution response information, the intent that the EMS preferentially meets.

With reference to the fourth possible implementation of the second aspect, in a fifth possible implementation, the intent conflict resolution response information includes an identifier of the first intent or an identifier of the second intent, the second intent is an intent that is in an active state and that is maintained in the EMS, the second intent is used to indicate the EMS to execute the third command on the first network element, and the first command and the third command are mutually exclusive; or the intent conflict resolution response information includes updated conflict policy information, and the conflict policy information is used to indicate the intent that the EMS preferentially meets when the first intent conflicts with another intent. According to the foregoing method, the intent conflict resolution response information sent by the NMS to the EMS may include the identifier of the first intent or the identifier of the second intent, or may include the updated conflict policy information, so that the EMS can determine, based on the intent conflict resolution response information, the intent that the EMS preferentially meets.

According to a third aspect, an embodiment of this application provides an intent execution apparatus. The intent execution apparatus has a function of implementing the method according to the first aspect. The function may be implemented by hardware, or may be implemented by hardware executing corresponding software. The hardware or the software includes one or more modules corresponding to the function.

According to a fourth aspect, an embodiment of this application provides an intent execution apparatus. The intent execution apparatus has a function of implementing the method according to the second aspect. The function may be implemented by hardware, or may be implemented by hardware executing corresponding software. The hardware or the software includes one or more modules corresponding to the function.

According to a fifth aspect, an embodiment of this application provides an intent execution apparatus. The intent execution apparatus includes at least one processor, at least one memory, and a communication interface. The communication interface, the at least one memory, and the at least one processor are coupled. The intent execution apparatus communicates with another device through the communication interface. The at least one memory is configured to store a computer program, so that when the computer program is executed by the at least one processor, the intent execution method according to any one of the first aspect and the possible implementations of the first aspect is implemented.

According to a sixth aspect, an embodiment of this application provides an intent execution apparatus. The intent execution apparatus includes at least one processor, at least one memory, and a communication interface. The communication interface, the at least one memory, and the at least one processor are coupled. The intent execution apparatus communicates with another device through the communication interface. The at least one memory is configured to store a computer program, so that when the computer program is executed by the at least one processor, the intent execution method according to any one of the second aspect and the possible implementations of the second aspect is implemented.

According to a seventh aspect, this application provides a system chip. The system chip may be used in an intent execution apparatus. The system chip includes at least one processor. Related program instructions are executed by the at least one processor, to implement a function of the EMS in the method according to any one of the first aspect and the designs of the first aspect. Optionally, the system chip may further include at least one memory, and the memory stores the related program instructions.

According to an eighth aspect, this application provides a system chip. The system chip may be used in an intent execution apparatus. The system chip includes at least one processor. Related program instructions are executed by the at least one processor, to implement a function of the NMS in the method according to any one of the second aspect and the designs of the second aspect. Optionally, the system chip may further include at least one memory, and the memory stores the related program instructions.

According to a ninth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the first aspect. For example, the computer may be at least one storage node.

According to a tenth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the second aspect. For example, the computer may be at least one storage node.

According to an eleventh aspect, an embodiment of this application provides a computer program product. When the computer program product runs on a computer, any method provided in the first aspect is performed. For example, the computer may be at least one storage node.

According to a twelfth aspect, an embodiment of this application provides a computer program product. When the computer program product runs on a computer, any method provided in the second aspect is performed. For example, the computer may be at least one storage node.

According to a thirteenth aspect, an embodiment of this application provides a communication system. The communication system may include any one or more of the following: the intent execution apparatus according to the third aspect, the intent execution apparatus according to the fourth aspect, the intent execution apparatus according to the fifth aspect, the intent execution apparatus according to the sixth aspect, the system chip according to the seventh aspect, the system chip according to the eighth aspect, the computer-readable storage medium according to the ninth aspect, the computer-readable storage medium according to the tenth aspect, the computer program product according to the eleventh aspect, or the computer program product according to the twelfth aspect.

It may be understood that any one of the intent execution apparatus, the system chip, the computer-readable storage medium, the computer program product, the communication system, or the like provided above is configured to perform a corresponding method provided above. Therefore, for beneficial effects that can be achieved by the intent execution apparatus, the system chip, the computer-readable storage medium, the computer program product, the communication medium, the computer program product, the communication system, or the like, refer to beneficial effects in the corresponding method. Details are not described herein.

According to a fourteenth aspect, an embodiment of this application provides an intent execution method. The method includes: An element management system EMS receives intent query information from a network management system NMS, where the intent query information is used to query an intent in the EMS. The EMS sends intent query response information to the NMS, where the intent query response information includes one or more intents and first parameters of the one or more intents. The first parameter of the intent is used to indicate whether the EMS is allowed to execute a command corresponding to the intent on a part of network elements in a scope of the intent.

According to the method provided in the fourteenth aspect, the EMS may receive the intent query information from the NMS, and send the intent query response information to the NMS based on the intent query information, so that the NMS can query the first parameter of the intent in the EMS.

With reference to the fourteenth aspect, in a first possible implementation, the intent query response information further includes conflict policy information of the intents. The conflict policy information of the intent is used to indicate an intent that the EMS preferentially meets when the intent conflicts with another intent. According to the foregoing method, the intent query response information sent by the EMS to the NMS further includes the conflict policy information of the intent, so that the NMS can further query the conflict policy information of the intent in the EMS.

With reference to the first possible implementation of the fourteenth aspect, in a second possible implementation, the conflict policy information of the intent includes one or more of the following policies: policy 1: determining that, in conflicting intents, an intent having a higher priority is the intent that the EMS preferentially meets; policy 2: determining that, in conflicting intents, an intent first received by the EMS or an intent subsequently received by the EMS is the intent that the EMS preferentially meets; or policy 3: determining that, in conflicting intents, an intent having a larger scope or an intent having a smaller scope is the intent that the EMS preferentially meets. According to the foregoing method, the conflict policy information sent by the EMS to the NMS includes one or more of the foregoing policy 1, policy 2, or policy 3, so that the NMS can further query, based on the intent query information, the policy in the conflict policy information of the intent in the EMS.

According to a fifteenth aspect, an embodiment of this application provides an intent execution method. The method includes: A network management system NMS sends intent query information to an element management system EMS, where the intent query information is used to query an intent in the EMS. The NMS receives intent query response information from the EMS, where the intent query response information includes one or more intents and first parameters of the one or more intents. The first parameter of the intent is used to indicate whether the EMS is allowed to execute a command corresponding to the intent on a part of network elements in a scope of the intent.

According to the method provided in the fifteenth aspect, the NMS may send the intent query information to the EMS, and receive the intent query response information from the EMS, so that the NMS can query the first parameter of the intent in the EMS.

With reference to the fifteenth aspect, in a first possible implementation, the intent query response information further includes conflict policy information of the intents. The conflict policy information of the intent is used to indicate an intent that the EMS preferentially meets when the intent conflicts with another intent. According to the foregoing method, the intent query response information received by the NMS from the EMS further includes the conflict policy information of the intent, so that the NMS can further query the conflict policy information of the intent in the EMS.

With reference to the first possible implementation of the fifteenth aspect, in a second possible implementation, the conflict policy information of the intent includes one or more of the following policies: policy 1: determining that, in conflicting intents, an intent having a higher priority is the intent that the EMS preferentially meets; policy 2: determining that, in conflicting intents, an intent first received by the EMS or an intent subsequently received by the EMS is the intent that the EMS preferentially meets; or policy 3: determining that, in conflicting intents, an intent having a larger scope or an intent having a smaller scope is the intent that the EMS preferentially meets. According to the foregoing method, the conflict policy information received by the NMS from the EMS includes one or more of the foregoing policy 1, policy 2, or policy 3, so that the NMS can further query, based on the intent query information, the policy in the conflict policy information of the intent in the EMS.

According to a sixteenth aspect, an embodiment of this application provides an intent execution apparatus. The intent execution apparatus includes a receiving module and a sending module. The receiving module is configured to receive intent query information from a network management system NMS, where the intent query information is used to query an intent in the intent execution apparatus. The sending module is configured to send intent query response information to the NMS, where the intent query response information includes one or more intents and first parameters of the one or more intents. The first parameter of the intent is used to indicate whether the intent execution apparatus is allowed to execute a command corresponding to the intent on a part of network elements in a scope of the intent.

According to the method provided in the sixteenth aspect, the intent execution apparatus may receive the intent query information from the NMS, and send the intent query response information to the NMS based on the intent query information, so that the NMS can query the first parameter of the intent in the intent execution apparatus.

With reference to the sixteenth aspect, in a first possible implementation, the intent query response information further includes conflict policy information of the intents. The conflict policy information of the intent is used to indicate an intent that the intent execution apparatus preferentially meets when the intent conflicts with another intent. According to the foregoing method, the intent query response information sent by the intent execution apparatus to the NMS further includes the conflict policy information of the intent, so that the NMS can further query the conflict policy information of the intent in the intent execution apparatus.

With reference to the first possible implementation of the sixteenth aspect, in a second possible implementation, the conflict policy information of the intent includes one or more of the following policies: policy 1: determining that, in conflicting intents, an intent having a higher priority is the intent that the intent execution apparatus preferentially meets; policy 2: determining that, in conflicting intents, an intent first received h the intent execution apparatus or an intent subsequently received by the intent execution apparatus is the intent that the intent execution apparatus preferentially meets; or policy 3: determining that, in conflicting intents, an intent having a larger scope or an intent having a smaller scope is the intent that the intent execution apparatus preferentially meets. According to the foregoing method, the conflict policy information sent by the intent execution apparatus to the NMS includes one or more of the foregoing policy 1, policy 2, or policy 3, so that the NMS can further query, based on the intent query information, the policy in the conflict policy information of the intent in the intent execution apparatus.

According to a seventeenth aspect, an embodiment of this application provides an intent execution apparatus. The intent execution apparatus includes a sending module and a receiving module. The sending module is configured to send intent query information to an element management system EMS, where the intent query information is used to query an intent in the EMS. The receiving module is configured to receive intent query response information from the EMS, where the intent query response information includes one or more intents and first parameters of the one or more intents. The first parameter of the intent is used, to indicate whether the EMS is allowed to execute a command corresponding to the intent on a part of network elements in a scope of the intent.

According to the method provided in the seventeenth aspect, the intent execution apparatus may send the intent query information to the EMS, and receive the intent query response information from the EMS, so that the intent execution apparatus can query the first parameter of the intent in the EMS.

With reference to the seventeenth aspect, in a first possible implementation, the intent query response information further includes conflict policy information of the intents. The conflict policy information of the intent is used to indicate an intent that the EMS preferentially meets when the intent conflicts with another intent. According to the foregoing method, the intent query response information received by the intent execution apparatus from the EMS further includes the conflict policy information of the intent, so that the intent execution apparatus can further query the conflict policy information of the intent in the EMS.

With reference to the first possible implementation of the seventeenth aspect, in a second possible implementation, the conflict policy information of the intent includes one or more of the following policies: policy 1: determining that, in conflicting intents, an intent having a higher priority is the intent that the EMS preferentially meets; policy 2: determining that, in conflicting intents, an intent first received by the EMS or an intent subsequently received by the EMS is the intent that the EMS preferentially meets; or policy 3: determining that, in conflicting intents, an intent having a larger scope or an intent having a smaller scope is the intent that the EMS preferentially meets. According to the foregoing method, the conflict policy information received by the intent execution apparatus from the EMS includes one or more of the foregoing policy 1, policy 2, or policy 3, so that the intent execution apparatus can further query, based on the intent query information, the policy in the conflict policy information of the intent in the EMS.

According to an eighteenth aspect, an embodiment of this application provides an intent execution apparatus. The intent execution apparatus includes at least one processor, at least one memory, and a communication interface. The communication interface, the at least one memory, and the at least one processor are coupled. The intent execution apparatus communicates with another device through the communication interface. The at least one memory is configured to store a computer program, so that when the computer program is executed by the at least one processor, the intent execution method according to any one of the fourteenth aspect and the possible implementations of the fourteenth aspect is implemented.

According to a nineteenth aspect, an embodiment of this application provides an intent execution apparatus. The intent execution apparatus includes at least one processor, at least one memory, and a communication interface. The communication interface, the at least one memory, and the at least one processor are coupled. The intent execution apparatus communicates with another device through the communication interface. The at least one memory is configured to store a computer program, so that when the computer program is executed by the at least one processor, the intent execution method according to any one of the fifteenth aspect and the possible implementations of the fifteenth aspect is implemented.

According to a twentieth aspect, this application provides a system chip. The system chip may be used in an intent execution apparatus. The system chip includes at least one processor. Related program instructions are executed by the at least one processor, to implement a function of the EMS in the method according to any one of the fourteenth aspect and the designs of the fourteenth aspect. Optionally, the system chip may further include at least one memory, and the memory stores the related program instructions.

According to a twenty-first aspect, this application provides a system chip. The system chip may be used in an intent execution apparatus. The system chip includes at least one processor. Related program instructions are executed by the at least one processor, to implement a function of the NMS in the method according to any one of the fifteenth aspect and the designs of the fifteenth aspect. Optionally, the system chip may further include at least one memory, and the memory stores the related program instructions.

According to a twenty-second aspect, an embodiment of this application provides a computer-readable storage medium, for example, a non-transient computer-readable storage medium. The computer-readable storage medium stores a computer program. When the computer program is run on a computer, the computer is enabled to perform any possible method according to the fourteenth aspect. For example, the computer may be at least one storage node.

According to a twenty-third aspect, an embodiment of this application provides a computer-readable storage medium, for example, a non-transient computer-readable storage medium. The computer-readable storage medium stores a computer program. When the computer program is run on a computer, the computer is enabled to perform any possible method according to the fifteenth aspect. For example, the computer may be at least one storage node.

According to a twenty-fourth aspect, an embodiment of this application provides a computer program product. When the computer program product runs on a computer, any method provided in the fourteenth aspect is performed. For example, the computer may be at least one storage node.

According to a twenty-fifth aspect, an embodiment of this application provides a computer program product. When the computer program product runs on a computer, any method provided in the fifteenth aspect is performed. For example, the computer may be at least one storage node.

According to a twenty-sixth aspect, an embodiment of this application provides a communication system. The communication system may include any one or more of the following: the intent execution apparatus according to the sixteenth aspect, the intent execution apparatus according to the seventeenth aspect, the intent execution apparatus according to the eighteenth aspect, the intent execution apparatus according to the nineteenth aspect, the system chip according to the twentieth aspect, the system chip according to the twenty-first aspect, the computer-readable storage medium according to the twenty-second aspect, the computer-readable storage medium according to the twenty-third aspect, the computer program product according to the twenty-fourth aspect, or the computer program product according to the twenty-fifth aspect.

It may be understood that any one of the intent execution apparatus, the system chip, the computer-readable storage medium, the computer program product, the communication system, or the like provided above is configured to perform a corresponding method provided above. Therefore, for beneficial effects that can be achieved by the intent execution apparatus, the system chip, the computer-readable storage medium, the computer program product, the communication system, or the like, refer to beneficial effects in the corresponding method. Details are not described herein.

DESCRIPTION OF EMBODIMENTS

The following describes implementations in embodiments of this application in detail with reference to the accompanying drawings.

Figure 1:
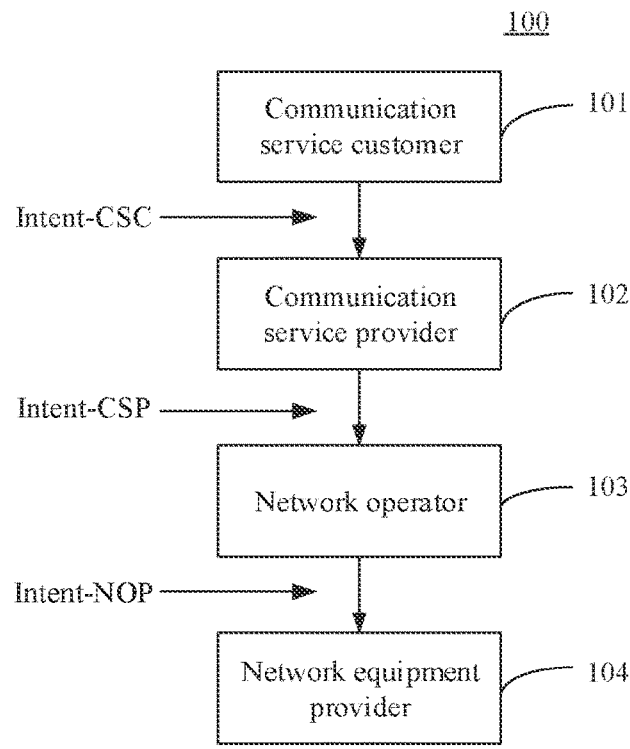
FIG. 1 is a schematic diagram of an intent hierarchical architecture according to an embodiment of this application.

FIG. 1 is a schematic diagram of an intent hierarchical architecture according to an embodiment of this application. An intent execution method provided in embodiments of this application may be applied to the hierarchical architecture shown in FIG. 1.

In FIG. 1, a network management system 100 may include a communication service customer (communication service customer, CSC) 101, a communication service provider (communication service provider, CSP) 102, a network operator (network operator, NOP) 103, and a network equipment provider (network equipment provider, NEP) 104.

The CSC 101 may be a user terminal. The CSP 102 may provide a communication service for the CSC 101, is responsible for operation of the communication service, including life cycle management of the communication service, and converts a corresponding communication service requirement into a network requirement. The NOP 103 may provide a network for the CSP 102, and is mainly responsible for life cycle management of the network. For example, the NOP 103 may provide a slice network and/or a non-slice network for the CSP 102. The NEP 104 may provide life cycle management of a subnet, life cycle management of a network element, and the like for the NOP 103.

In FIG. 1, the CSC 101 may propose an intent-CSC (intent-CSC), and send the intent-CSC to the CSP 102. The CSP 102 receives the intent-CSC, and may translate the intent-CSC into mm intent-CSP (intent-CSP). The CSP 102 may also propose an intent-CSP. The CSP 102 may send the intent-CSP obtained through translation and/or the proposed intent-CSP to the NOP 103. The NOP 103 receives the intent-CSP, and may translate the intent-CSP into an intent-NOP (intent-NOP). The NOP 103 may also propose an intent-NOP. The NOP 103 may send the intent-NOP obtained through translation and/or the proposed intent-NOP to the NEP 104. The NEP 104 receives the intent-NOP, and may translate the intent-NOP into a command corresponding to the intent-NOP. In addition, the NEP 104 delivers the command to a network element (network element. NE) (not shown in FIG. 1) corresponding to the command, and monitors a network status when the NE corresponding to the command executes the command, to ensure fulfillment of the intent.

The intent-CSC may express a service-level management requirement, but does not involve implementation details of a service and a network. The intent-CSP may express a network-level management requirement, but does not involve professional knowledge of the network operator. The intent-NOP may express a network resource-level management requirement, hut does not involve operation details of a physical network device and/or a virtualized infrastructure.

It should be noted that, in the following embodiments of this application, the intent-NOP is used as an example to describe the intent execution method. For an intent-CSC execution method and an intent-CSP execution method, refer to descriptions of the intent-NOP execution method. Details are not described again.

In some embodiments, the NOP 103 may be a network management system (network management system, NMS). The NEP 104 may be an element management system (element management system, EMS).

The NMS may be a management system responsible for network operation, management, and maintenance functions. The NMS may provide five basic functions: fault, configuration, accounting, performance, or security (fault, configuration, accounting, performance or security, FCAPS). Managed objects of the NMS may include all entities in the network, for example, network devices, application programs, server systems, routers, switches, hubs (HUBs), and auxiliary devices (for example, an uninterruptible power system (uninterrupted power system, UPS)). The NMS may provide a network view of the entire system for a network administrator.

The EMS may be element management software conforming to an international telecommunication union telecommunication standardization sector (ITU telecommunication standardization sector, ITU-T) standard, and may manage one or more types of network elements.

Optionally, the EMS allows a user to independently manage all features of each network element.

In some embodiments, the EMS may perform operations such as intent translation, intent decomposition, and conflict detection. During actual application, the EMS may receive an intent (for example, the intent-NOP) of an upper-layer network element through an external interface, and feed back an intent fulfillment status to the intent sender. The EMS may further send sub-intents obtained through intent decomposition to a lower-layer network element.

Optionally; each device in FIG. 1 in embodiments of this application, for example, the CSC 101, the CSP 102, the NOP 103, or the NEP 104, may be a functional module in an apparatus. It may be understood that the functional module may be an element in a hardware device, a software functional module running on hardware, or a virtualized function instantiated on a platform (for example, a cloud platform).

Figure 2:
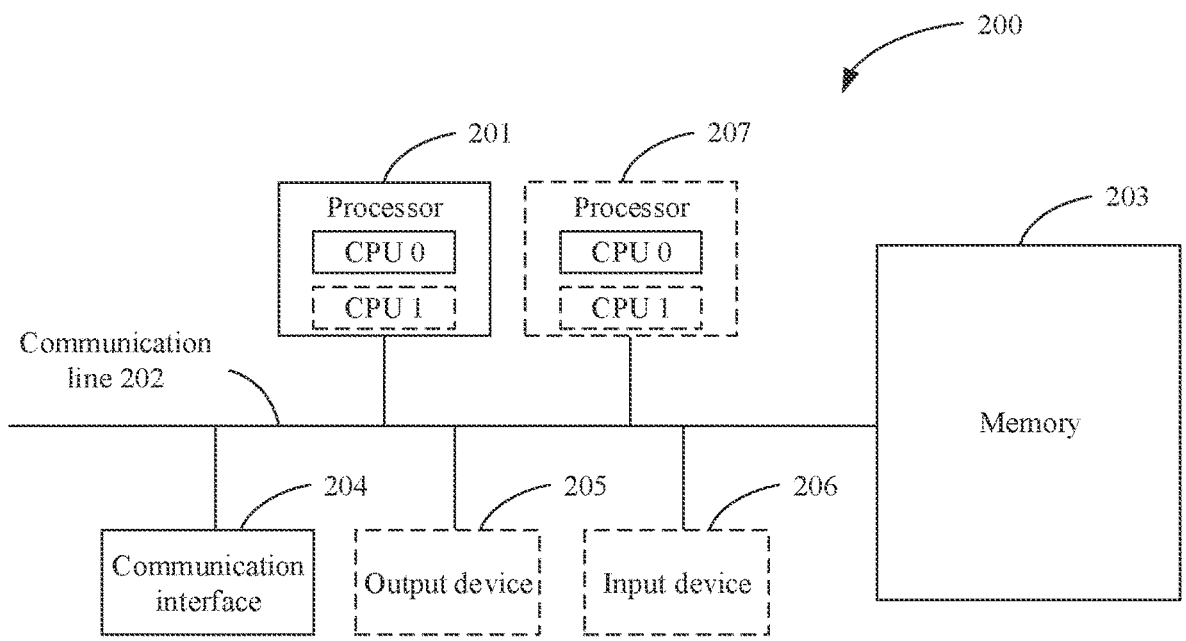
FIG. 2 is a schematic diagram of a hardware structure of an apparatus according to an embodiment of this application.

For example, each apparatus in FIG. 1 may be implemented by using an apparatus 200 in FIG. 2. FIG. 2 is a schematic diagram of a hardware structure of an apparatus applicable to an embodiment of this application. The apparatus 200 may include at least one processor 201, a communication line 202, a memory 203, and at least one communication interface 204.

The processor 201 may be a general-purpose central processing unit (central processing unit, CPU), a microprocessor, an application-specific integrated circuit (application-specific integrated circuit, ASIC), or one or more integrated circuits configured to control execution of programs in solutions in this application.

The communication line 202 may include a path for transferring information between the foregoing components, for example, a bus.

The communication interface 204 is configured to communicate with another device or a communication network by using any apparatus such as a transceiver, and is, for example, an Ethernet interface, a radio access network (radio access network, RAN) interface, or a wireless local area network (wireless local area network, WLAN) interface.

The memory 203 may be a read-only memory read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through the communication line 202. Alternatively, the memory may be integrated with the processor. The memory provided in this embodiment of this application may usually be non-volatile. The memory 203 is configured to store computer-executable instructions for executing the solutions in this application, and execution is controlled by the processor 201. The processor 201 is configured to execute the computer-executable instructions stored in the memory 203, to implement the method provided in embodiments of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the apparatus 200 may include a plurality of processors, for example, the processor 201 and a processor 207 in FIG. 2. Each of the processors may be a single-core (single-CPU) processor, or may be a multi-core (multi-CPU) processor. The processor herein may refer to one or more devices, circuits, and/or processing cores configured to process data (for example, computer program instructions).

During specific implementation, in an embodiment, the apparatus 200 may further include an output device 205 and an input device 206, The output device 205 communicates with the processor 201, and may display information in a plurality of manners. For example, the output device 205 may be a liquid crystal display (liquid crystal display, LCD), a light-emitting diode (light-emitting diode, LED) display device, a cathode ray tube (cathode ray tube, CRT) display device, or a projector (projector). The input device 206 communicates with the processor 201, and may receive a user input in a plurality of manners. For example, the input device 206 may be a mouse, a keyboard, a touchscreen device, or a sensing device.

With reference to FIG. 1 and FIG. 2, the following describes in detail the intent execution method provided in embodiments of this application by using the intent-NOP as an example. An apparatus (for example, an NMS, an EMS, a first network element, a second network element, or a third network element) in the following embodiments may include components shown in FIG. 2.

It may be understood that, in embodiments of this application, the NMS or the EMS may perform some or all of steps in embodiments of this application. The steps are merely examples. In embodiments of this application, other steps or variations of various steps may further be performed. In addition, the steps may be performed in a sequence different from a sequence presented in embodiments of this application, and not all steps in embodiments of this application need to be performed.

Figure 3:
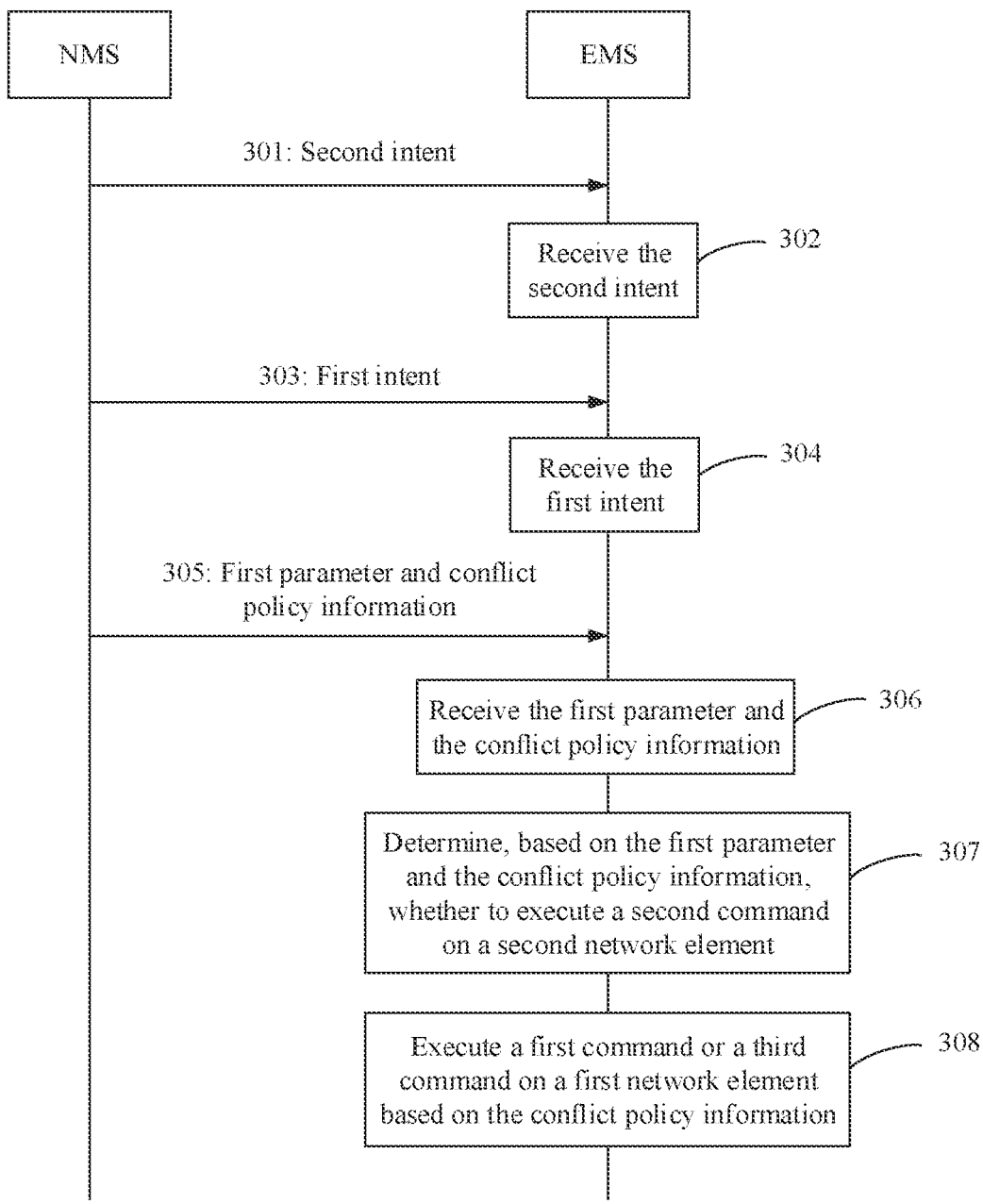
FIG. 3 is a schematic flowchart 1 of an intent execution method according to an embodiment of this application.

FIG. 3 shows an intent execution method according to an embodiment of this application. The intent execution method includes step 301 to step 308.

Step 301: An NMS sends a second intent to an EMS.

The NMS may be the NOP 103 in FIG. 1, and the EMS may be the NEP 104 in FIG. 1.

The second intent may be used to indicate the EMS to execute a third command on a first network element.

Optionally, the second intent is further used to indicate the EMS to execute a fourth command on a third network element.

The fourth command may be the same as or different from the third command.

The second intent may include second intent driven action (IntentDrivenAction) information and second intent driven object (IntentDrivenObject) information.

The second intent driven action information may include a second intent driven action name (IntentDrivenActionName) and a second intent driven action property (IntentDrivenActionProperties). The second intent driven action property may be one or more properties required for completing a second intent driven action.

The second intent driven object information may include a second intent driven object name (IntentDrivenObjectName) and a second intent driven object property (IntentDrivenObjectProperties). The second intent driven object property max be used to identify a property of an object instance.

For example, a formal expression of the second intent may be shown as follows:
<intentExpression>:
=<IntentDrivenAction><IntentDrivenObject>
<IntentDrivenAction>:=
<IntentDrivenActionName><IntentDrivenActionProperties>
<IntentDrivenObject>:=
<IntentDrivenObjectName><IntentDrivenObjectProperties>

For example, the second intent is: In an area 1 of Pudong district, Shanghai, a percentage of users whose data rate is less than 5 Mbps is less than 1%, and an average rate is not less than 7 Mbps, A formal expression of the second intent may be shown in Table 1. The second intent driven action name is optimization, and the second intent driven action property includes an optimization type, a maximum percentage of user equipment having a low data rate, a low data rate threshold, and a minimum average data rate. The optimization type is a data rate, the maximum percentage of user equipment having a low data rate is 1%, the low data rate threshold is 5 Mbps, and the minimum average data rate is 7 Mbps. An intent driven object name of the second intent is Pudong district, Shanghai, and an intent driven object property of the second intent is the area 1.

TABLE 1

| Intent driven action | | Intent driven object | |
| --- | --- | --- | --- |
| Intent driven action name | Intent driven action property | Intent driven object name | Intent driven object property |
| Optimization | Data rate [1%, 5 Mbps] 7 Mbps | Pudong district, Shanghai | Area 1 |

The first network element and the third network element may be network elements in a scope of the second intent. The scope of the second intent may be an area identified by the second intent driven object property.

The first network element or the third network element may be a mobile network element, for example, a base station or a core network element.

Optionally, that an NMS sends a second intent to an EMS includes: The NMS sends first request information to the EMS, where the first request information includes information about the second intent.

In some embodiments, the first request information may be used to request to create the second intent (createintent). The information about the second intent may include the second intent driven action information and the second intent driven object information.

In some embodiments, the first request information may be used to request to implement the second intent (implementintent)). The information about the second intent may include the second intent driven action information and the second intent driven object information.

In some embodiments, the first request information may be used to request to modify the second intent (modifyIntent). The information about the second intent may include an identifier of the second intent and information about the to-be-modified second intent.

The information about the to-be-modified second intent may include the second intent driven action property, the second intent driven object property, a second parameter, conflict policy information of the second intent, and/or the like.

The second parameter may be used to indicate whether the EMS is allowed to execute a command corresponding to the second intent on a part of network elements in the scope of the second intent. For example, the second parameter may be used to indicate whether the EMS is allowed to execute the third command on the first network element; or the second parameter may be used to indicate whether the EMS is allowed to execute the fourth command on the third network element.

For example, the second parameter may indicate, by using a value of the second parameter, whether the EMS is allowed to execute the command corresponding to the second intent on the part of network elements in the scope of the second intent.

For example, the second parameter may be a Boolean-type parameter. When the value of the second parameter is true (true), the second parameter may indicate that the EMS is allowed to execute the fourth command on the third network element; or when the value of the second parameter is false (false), the second parameter may indicate that the EMS is not allowed to execute the fourth command on the third network element.

For another example, the second parameter may perform indication by using a binary bit. When the value of the second parameter is 1, the second parameter may indicate that the EMS is allowed to execute the fourth command on the third network element; or when the value of the second parameter is 0, the second parameter may indicate that the EMS is not allowed to execute the fourth command on the third network element.

It should be noted that the foregoing descriptions are merely examples of the second parameter, and the second parameter may alternatively be a parameter in another form. This is not limited.

Optionally, the second intent includes the second parameter. For example, the second intent driven action property includes the second parameter. For another example, the second intent includes the second intent driven action, a second intent driven object, and the second parameter.

The conflict policy information of the second intent may be used to indicate an intent that the EMS preferentially meets when the second intent conflicts with another intent. The intent that the EMS preferentially meets may be an intent that the EMS determines to execute. For descriptions of the conflict policy information of the second intent, refer to the following descriptions of conflict policy information of a first intent. Details are not described again.

Step 302: The EMS receives the second intent from the NMS.

Optionally, that the EMS receives the second intent from the NMS includes: The EMS receives the first request information from the NMS, where the first request information includes the information about the second intent.

In some embodiments, if the first request information is used to request to create the second intent, the information about the second intent may include the second intent driven action information and the second intent driven object information. After receiving the first request information, the EMS may create the second intent based on the second intent driven action and the second intent driven object, set a status of the second intent to an inactive state, and send first response information to the NMS. The first response information is used to indicate a creation result of the second intent (for example, the second intent is successfully; created or the second intent fails to be created), and may include an identifier of the second intent. Subsequently, if the second intent needs to be executed, the EMS may further receive activation request information sent by the NMS, where the activation request information is used to request to activate the second intent. After receiving the activation request information, the EMS may convert the status of the second intent from the inactive state to an active state.

The inactive state of the second intent may be used to indicate that the second intent is stored in the EMS as a management object (for example, a record in a database), but is not translated and executed. The active state of the second intent may be used to indicate that the second intent has been translated or executed, and network monitoring, automatic policy adjustment, and the like that are performed by the EMS to ensure fulfillment of the second intent are also being performed.

In some embodiments, if the first request information is used to request to implement the second intent, the information about the second intent may include the second intent driven action information and the second intent driven object information. After receiving the first request information, the EMS may translate the second intent into the command corresponding to the second intent, send the command to a network element corresponding to the command, and send first response information to the NMS. The first response information is used to indicate an implementation result of the second intent (for example, the second intent is successfully implemented or the second intent fails to be implemented), and may include an identifier of the second intent.

In some embodiments, if the first request information is used to request to modify the second intent, the information about the second intent may include the identifier of the second intent and the information about the to-be-modified second intent. The information about the to-be-modified second intent may include the second intent driven action property, the second intent driven object property, the second parameter, the conflict policy information of the second intent, and/or the like. The EMS receives the first request information, to modify information corresponding to the second intent, and sends first response information to the NMS. The first response information is used to indicate a modification result of the second intent (for example, the second intent is successfully modified or the second intent fails to be modified).

Optionally, after receiving the second intent from the NMS, the EMS sends message reception acknowledgment information to the NMS, where the message reception acknowledgment information is used to indicate that the EMS has received the second intent.

Optionally, the EMS receives the second intent, and maintains the second intent after activating the second intent.

Step 303: The NMS sends the first intent to the EMS.

The first intent may be used to indicate the EMS to execute a first command on the first network element and execute a second command on a second network element.

The first command may be the same as or different from the second command, and the first command and the third command are mutually exclusive. For example, the first command is to set a value of a parameter to 5, and the third command is to set the value of the parameter to 6.

Optionally, the first intent may include first intent driven action information and first intent driven object information. For descriptions of the first intent driven action information and the first intent driven object information, refer to the foregoing descriptions of the second intent driven action information and the second intent driven object information. Details are not described again.

The first network element and the second network element may be network elements in a scope of the first intent. The scope of the first intent may be an area identified by a first intent driven object property.

That the first command and the third command are mutually exclusive may also be described as that the first intent conflicts with the second intent. The first network element may also be described as a conflicting network element, and the second network element and the third network element may also be described as non-conflicting network elements.

It should be noted that a plurality of intents in the active state may be maintained in the EMS. The first intent may conflict with the plurality of intents in the active state. When the first intent conflicts with the plurality of intents in the active state, for descriptions of the intent execution method, refer to an intent execution method performed when the first intent conflicts with the second intent. Details are not described again.

Figure 4:
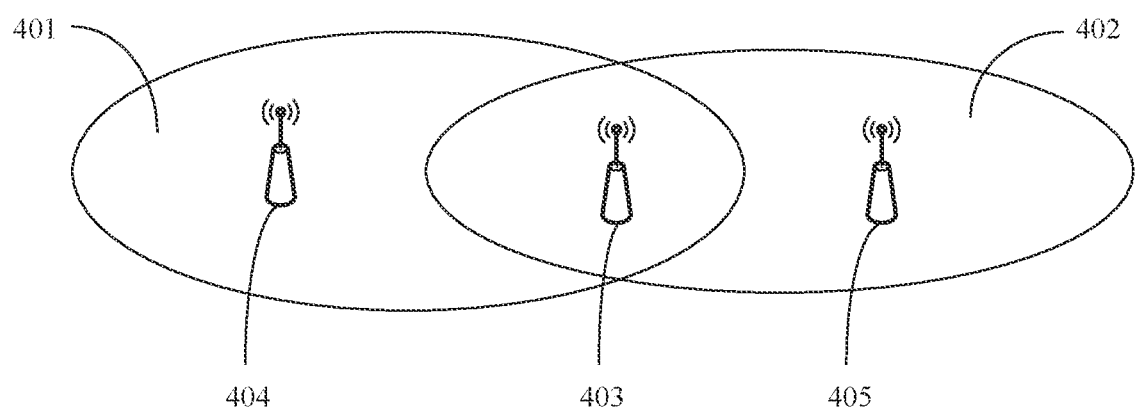
FIG. 4 is a schematic diagram of an intent conflict according to an embodiment of this application.

As shown in FIG. 4, an example in which a network element is a base station is used to describe an intent conflict. In FIG. 4, a scope of an intent 1 is an area 401, and a scope of an intent 2 is an area 402. The area 401 includes a network element 403 and a network element 404, and the area 402 includes a network element 403 and a network element 405. The intent 1 indicates the EMS to execute a command 1 on the network element 403 and execute a command 2 on the network element 404, and the intent 2 indicates the EMS to execute a command 3 on the network element 403 and execute a command 4 on the network element 405. The command 1 and the command 3 are mutually exclusive.

Optionally, that the NMS sends the first intent to the EMS includes: The NMS sends second request information to the EMS, where the second request information includes information about the first intent.

In some embodiments, the second request information may be used to request to create the first intent (createintent). The information about the first intent may include the first intent driven action information and the first intent driven object information.

In some embodiments, the second request information may be used to request to implement the first intent (implementintent). The information about the first intent may include the first intent driven action information and the first intent driven object information.

In some embodiments, the second request information may be used to request to modify the first intent (modifyIntent). The information about the first intent may include an identifier of the first intent and information about the to-be-modified first intent.

The information about the to-be-modified first intent may include first intent driven action property, the first intent driven object property, a first parameter, conflict policy information of the first intent, and/or the like. For descriptions of the first parameter and the conflict policy information of the first intent, refer to descriptions of step 305. Details are not described again.

Step 304: The EMS receives the first intent from the NMS.

Optionally, that the EMS receives the first intent from the NMS includes: The EMS receives the second request information from the NMS, where the second request information includes the information about the first intent.

In some embodiments, if the second request information is used to request to create the first intent, the information about the first intent may include the first intent driven action information and the first intent driven object information. After receiving the second request information, the EMS may create the first intent based on the first intent driven action and the first intent driven object, set a status of the first intent to an inactive state, and send second response information to the NMS. The second response information is used to indicate a creation result of the first intent (for example, the first intent is successfully created or the first intent fails to be created), and may include an identifier of the first intent. Subsequently, if the first intent needs to be executed, the EMS may further receive activation request information sent by the NMS, where the activation request information is used to request to activate the first intent, After receiving the activation request information, the EMS may convert the status of the first intent from the inactive state to an active state.

In some embodiments, if the second request information is used to request to implement the first intent, the information about the first intent may include the first intent driven action information and the first intent driven object information. After receiving the second request information, the EMS may translate the first intent into a command corresponding to the first intent, send the command to a network element corresponding to the command, and send second response information to the NMS. The second response information is used to indicate an implementation result of the first intent (for example, the first intent is successfully implemented or the first intent fails to be implemented), and may include an identifier of the first intent.

In some embodiments, if the second request information is used to request to modify the first intent, the information about the first intent may include the identifier of the first intent and the information about the to-be-modified first intent. The information about the to-be-modified first intent may include the first intent driven action property, the first intent driven object property, the first parameter, the conflict policy information of the first intent, and/or the like. The EMS receives the second request information, to modify information corresponding to the first intent, and sends second response information to the NMS. The second response information is used to indicate a modification result of the first intent (for example, the first intent is successfully modified or the first intent fails to be modified).

Optionally, after receiving the first intent from the NMS, the EMS sends message reception acknowledgment information to the NMS, where the message reception acknowledgment information is used to indicate that the EMS has received the first intent.

Step 305: The NMS sends the first parameter and the conflict policy information to the EMS.

The first parameter may be used to indicate whether the EMS is allowed to execute the command corresponding to the first intent on a part of network elements in the scope of the first intent. For example, the first parameter may be used to indicate whether the EMS is allowed to execute the first command on the first network element; or the first parameter may be used to indicate whether the EMS is allowed to execute the second command on the second network element.

For example, the first parameter may indicate, by using a value of the first parameter, whether the EMS is allowed to execute the command corresponding to the first intent on the part of network elements in the scope of the first intent.

For example, the first parameter may be a Boolean-type parameter. When the value of the first parameter is true (true), the first parameter may indicate that the EMS is allowed to execute the second command on the second network element; or when the value of the first parameter is false (false), the first parameter may indicate that the EMS is not allowed to execute the second command on the second network element.

For another example, the first parameter may perform indication by using a binary bit. When the value of the first parameter is 1, the first parameter may indicate that the EMS is allowed to execute the second command on the second network element; or when the value of the first parameter is 0, the first parameter may indicate that the EMS is not allowed to execute the second command on the second network element.

It should be noted that the foregoing descriptions are merely examples of the first parameter, and the first parameter may alternatively be a parameter in another form. This is not limited.

In some embodiments, the first intent may include the first parameter. For example, the first intent driven action property includes the first parameter. For another example, the first intent includes the first intent driven action, the first intent driven object, and the first parameter.

It should be noted that, if the first intent includes the first parameter, in the method shown in FIG. 3, the NMS may not send the first parameter to the EMS.

The conflict policy information may be used to indicate an intent that the EMS preferentially meets when the first intent conflicts with another intent. The conflict policy information may also be described as conflict policy information of the first intent.

Optionally, one piece of conflict policy information is configured for each intent. Conflict policy information of different intents is different or the same. This is not limited. For example, the conflict policy information of the first intent may be the same as or different from the conflict policy information of the second intent. If same conflict policy information is configured for the intents, the conflict policy information may be preconfigured in the EMS. In this case, in the method shown in FIG. 3, the NMS does not send the conflict policy information to the EMS.

Optionally, the conflict policy information includes one or more of the following policies.

Policy 1: Determine that, in conflicting intents, an intent having a higher priority is the intent that the EMS preferentially meets.

In some embodiments, the first intent may alternatively include a third parameter. For example, the first intent driven action property includes the third parameter. For another example, the first intent includes the first intent driven action, the first intent driven object, and the third parameter. The third parameter may be used to indicate a priority of the first intent. The second intent may alternatively include a fourth parameter. For example, the second intent driven action property includes the fourth parameter. For another example, the second intent includes the second intent driven action, the second intent driven object, and the fourth parameter. The fourth parameter may be used to indicate a priority of the second intent. When the first intent conflicts with the second intent, the EMS may determine that, in the first intent and the second intent, an intent having a higher priority or an intent having a lower priority is the intent that the EMS preferentially meets.

Policy 2: Determine that, in conflicting intents, an intent first received by the EMS or an intent subsequently received by the EMS is the intent that the EMS preferentially meets.

In some embodiments, the EMS receives the second intent, and may locally store time at which the second intent is received. The EMS receives the first intent, and may locally store time at which the first intent is received. When the first intent conflicts with the second intent, the EMS may determine that, in the first intent and the second intent, an intent whose receiving time is earlier or an intent whose receiving time is later is the intent that the EMS preferentially meets.

Policy 3: Determine that, in conflicting intents, an intent having a larger scope or an intent having a smaller scope is the intent that the EMS preferentially meets.

In some embodiments, when the first intent conflicts with the second intent, the EMS may determine that, in the first intent and the second intent, an intent whose area identified by an intent driven object property is larger or an intent whose area identified by an intent driven object property is smaller is the intent that the EMS preferentially meets.

It should be noted that the foregoing policy 1, policy 2, or policy 3 is merely an example of the conflict policy information, During actual application, the conflict policy information may further include another policy. This is not limited.

Further, optionally, a policy in the conflict policy information corresponds to a priority. When the conflict policy information includes a plurality of policies, the EMS determines, according to priorities of the policies, the intent that the EMS preferentially meets.

Optionally, that the EMS determines, according to priorities of the policies, the intent that the EMS preferentially meets includes: The EMS determines, according to a policy having a higher priority or a policy having a lower priority in the conflict policy information, the intent that the EMS preferentially meets.

For example, the conflict policy information includes policy 1, policy 2, and policy 3, where a priority of policy 1 is 1, a priority of policy 2 is 2, a priority of policy 3 is 3, and a smaller value indicates a higher priority. If the EMS determines, according to a policy having a higher priority in the conflict policy information, the intent that the EMS preferentially meets, the EMS determines, according to policy 1, the intent that the EMS preferentially meets; or if the EMS determines, according to a policy having a lower priority in the conflict policy information, the intent that the EMS preferentially meets, the EMS determines, according to policy 3, the intent that the EMS preferentially meets.

Step 306: The EMS receives the first parameter and the conflict policy information from the NMS.

Step 307: The EMS determines, based on the first parameter and the conflict policy information, whether to execute the second command on the second network element.

In some embodiments, when the EMS determines that the intent that the EMS preferentially meets is the second intent, if the first parameter indicates that the EMS is allowed to execute the second command on the second network element, that the EMS determines, based on the first parameter and the conflict policy information, whether to execute the second command on the second network element includes: The EMS executes the second command on the second network element. For specific descriptions of this process, refer to the following descriptions in a first implementation scenario of the method shown in FIG. 3. Details are not described again.

In some embodiments, when the EMS determines that the intent that the EMS preferentially meets is the second intent, if the first parameter indicates that the EMS is not allowed to execute the second command on the second network element, the EMS sends first notification information to the NMS, where the first notification information indicates that the first intent conflicts with another intent. For specific descriptions of this process, refer to the following descriptions in a second implementation scenario of the method shown in FIG. Details are not described again.

In some embodiments, when the EMS determines that the intent that the EMS preferentially meets is the first intent, that the EMS determines, based on the first parameter and the conflict policy information, whether to execute the second command on the second network element includes: The EMS executes the second command on the second network element. For specific descriptions of this process, refer to the following descriptions in a third implementation scenario or a fourth implementation scenario of the method shown in FIG. 3. Details are not described again.

Step 308: The EMS executes the first command or the third command on the first network element based on the conflict policy information.

In some embodiments, when the EMS determines that the intent that the EMS preferentially meets is the second intent, that the EMS executes the first command or the third command on the first network element based on the conflict policy information includes: The EMS executes the third command on the first network element. For specific descriptions of this process, refer to the following descriptions in the first implementation scenario and the second implementation scenario of the method shown in FIG. 3. Details are not described again.

In some embodiments, when the EMS determines that the intent that the EMS preferentially meets is the first intent, that the EMS executes the first command or the third command on the first network element based on the conflict policy information includes: The EMS executes the first command on the first network element. For specific descriptions of this process, refer to the following descriptions in the third implementation scenario of the method shown in FIG. 3. Details are not described again.

In some embodiments, the second intent is further used to indicate the EMS to execute the fourth command on the third network element. When the EMS determines that the intent that the EMS preferentially meets is the first intent, if the second parameter indicates that the EMS is not allowed to execute the fourth command on the third network element, the EMS executes the first command on the first network element, executes the second command on the second network element, and cancels the second intent based on the second parameter. For specific descriptions of this process, refer to the following descriptions in the fourth implementation scenario of the method shown in FIG. 3. Details are not described again.

According to the method shown in FIG. 3, the NMS may send the second intent, the first intent, the first parameter, and the conflict policy information to the EMS. When the first intent conflicts with the second intent, the EMS may determine, based on the first parameter and the conflict policy information, whether to execute the second command on the second network element, and determine, based on the conflict policy information, to execute the first command or the third command on the first network element, so that the EMS may partially execute the first intent when an intent conflict occurs. This improves intent execution flexibility and user experience.

Further, optionally, in the first implementation scenario of the method shown in FIG. 3, when the EMS determines that the intent that the EMS preferentially meets is the second intent, if the first parameter indicates that the EMS is allowed to execute the second command on the second network element, that the EMS determines, based on the first parameter and the conflict policy information, whether to execute the second command on the second network element includes: The EMS executes the second command on the second network element. That the EMS executes the first command or the third command on the first network element based on the conflict policy information includes: The EMS executes the third command on the first network element. For this process, refer to FIG. 5. In the method shown in FIG. 3, step 307 includes step 501, and step 308 includes step 502.

Step 501: The EMS executes the second command on the second network element.

In some embodiments, the EMS may determine, based on the conflict policy information, that the intent that the EMS preferentially meets is the second intent. When the first parameter indicates that the EMS is allowed to execute the second command on the second network element, the EMS executes the second command on the second network element.

Optionally, that the EMS executes the second command on the second network element includes: The EMS sends the second command to the second network element.

The second command is obtained by the EMS by translating the first intent.

Optionally, after step 501, the method further includes: The EMS sends first notification information to the NMS.

The first notification information may be used to indicate an execution result of the first intent. The execution result of the first intent may include: The intent is partially fulfilled (IntentPartialFulfilled).

Figure 5:
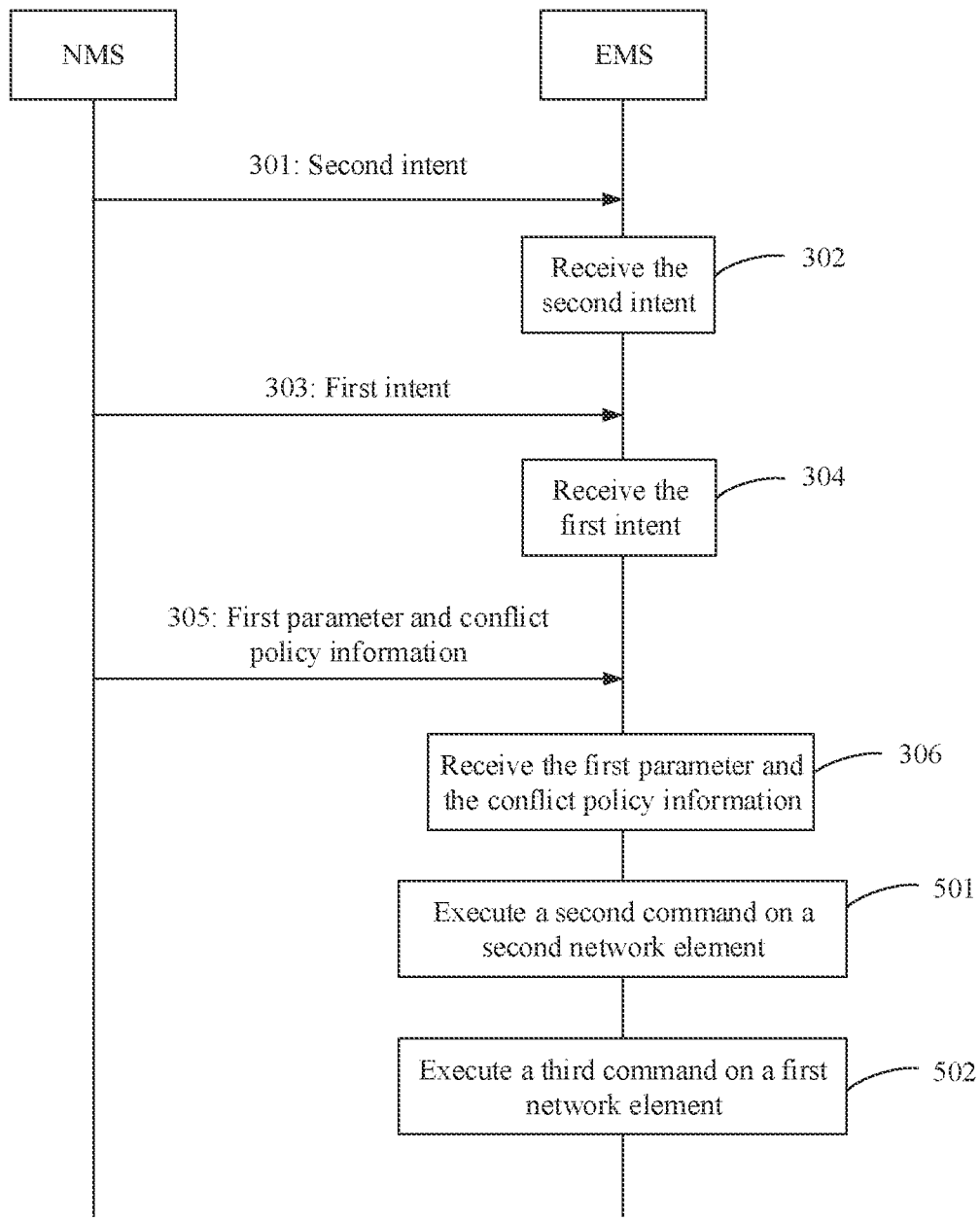
FIG. 5 is a schematic flowchart 2 of an intent execution method according to an embodiment of this application.

It should be noted that, if the first network element is the same as the second network element, and the first parameter indicates that the EMS is allowed to execute the command corresponding to the first intent on the part of network elements in the scope of the first intent, the method shown in FIG. 5 does not include step 501, and the execution result of the first intent may include: The intent is unfulfilled (IntentUnFulfilled).

Step 502: The EMS executes the third command on the first network element.

In some embodiments, the EMS may determine, based on the conflict policy information, that the intent that the EMS preferentially meets is the second intent. The EMS executes the third command on the first network element.

Optionally, that the EMS executes the third command on the first network element includes: The EMS sends the third command to the first network element.

The third command is obtained by the EMS by translating the second intent.

Optionally, after step 502, the method further includes: The EMS sends second notification information to the NMS.

The second notification information may be used to indicate an execution result of the second intent. The execution result of the second intent may include: The intent is fulfilled (IntentFulfilled).

It should be noted that, if the EMS has executed the third command on the first network element after receiving the second intent, the method shown in FIG. 5 does not include step 502. In this case, the EMS only needs to maintain the second intent.

Based on the first implementation scenario shown in FIG. 3, when the EMS determines that the intent that the EMS preferentially meets is the second intent, if the first parameter indicates that the EMS is allowed to execute the second command on the second network element, the EMS may execute the second command on the second network element and execute the third command on the first network element. In this way, when the first intent conflicts with the second intent, both the first intent and the second intent can be fulfilled, where the first intent is partially fulfilled, and the second intent is fulfilled.

Figure 6:
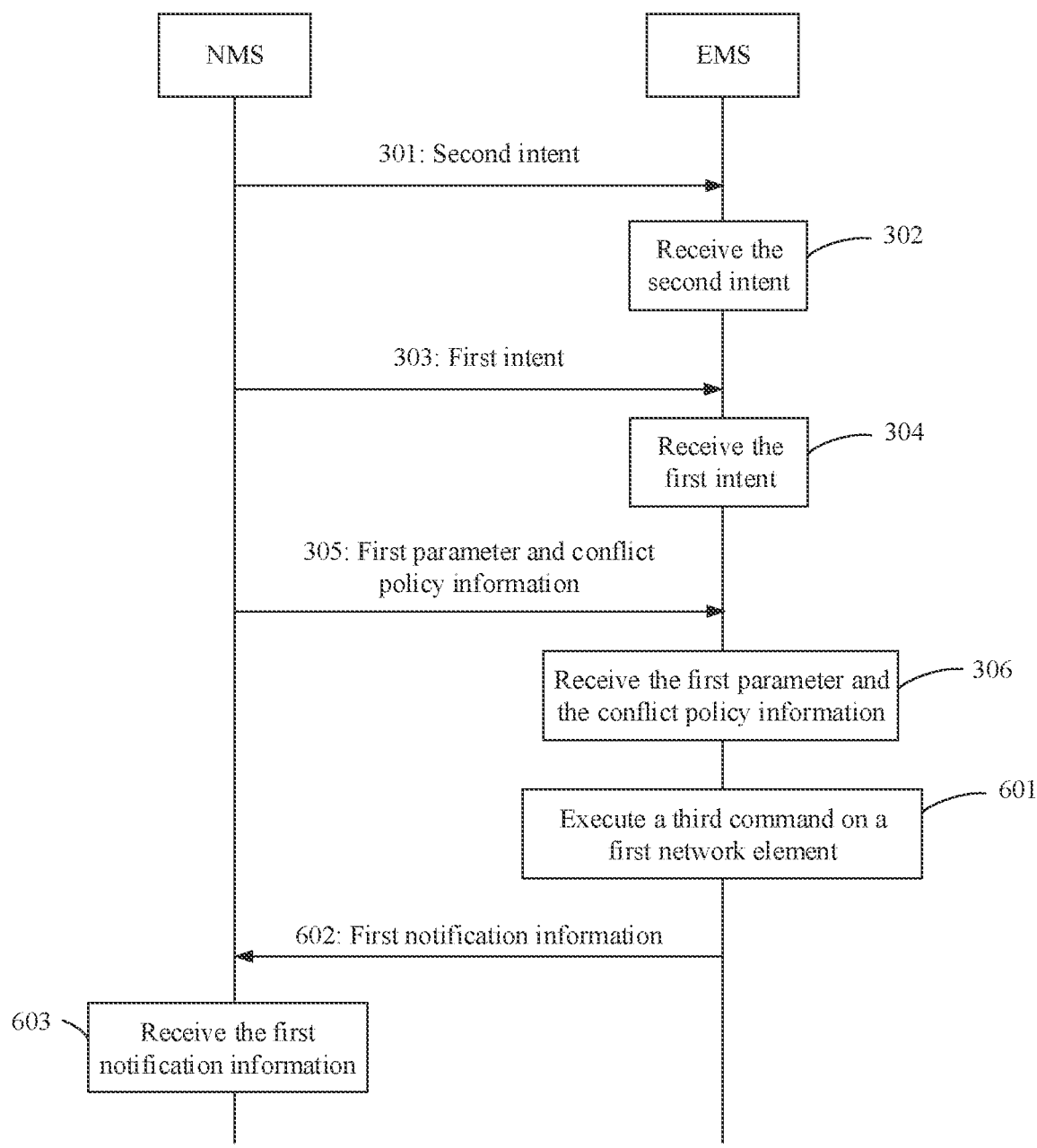
FIG. 6 is a schematic flowchart 3 of an intent execution method according to an embodiment of this application.

Further, optionally, in the second implementation scenario of the method shown in FIG. 3, when the EMS determines that the intent that the EMS preferentially meets is the second intent, if the first parameter indicates that the EMS is not allowed to execute the second command on the second network element, the EMS sends the first notification information to the NMS, where the first notification information indicates that the first intent conflicts with another intent. That the EMS executes the first command or the third command on the first network element based on the conflict policy information includes: The EMS executes the third command on the first network element. For this process, refer to FIG. 6. The method shown in FIG. 3 does not include step 307, step 308 in the method shown in FIG. 3 includes step 601, and the method shown in FIG. 3 further includes step 602 and step 603.

Step 601: The EMS executes the third command on the first network element.

For specific descriptions of step 601, refer to corresponding descriptions of step 502. Details are not described again.

Step 602: If the first parameter indicates that the EMS is not allowed to execute the second command on the second network element, the EMS sends the first notification information to the NMS.

The first notification information may be used to indicate an execution result of the first intent. The execution result of the first intent may include: An intent conflict occurs (IntentConflict).

Step 603: The NMS receives the first notification information from the EMS.

Based on the second implementation scenario shown in FIG. 3, when the EMS determines that the intent that the EMS preferentially meets is the second intent, if the first parameter indicates that the EMS is not allowed to execute the second command on the second network element, the EMS may send the first notification information to the NMS, and execute the third command on the first network element. In this way, the NMS knows that the first intent conflicts with another intent, and may cancel the first intent based on a specific requirement or indicate the EMS to translate the first intent into another command, where the another command does not conflict with the command of the second intent.

Further, optionally, in the third implementation scenario of the method shown in FIG. 3, when the EMS determines that the intent that the EMS preferentially meets is the first intent, that the EMS determines, based on the first parameter and the conflict policy information, whether to execute the second command on the second network element includes: The EMS executes the second command on the second network element. That the EMS executes the first command or the third command on the first network element based on the conflict policy information includes: The EMS executes the first command on the first network element. For this process, refer to FIG. 7. In the method shown in FIG. 3, step 307 includes step 701, and step 308 includes step 702.

Step 701: The EMS executes the second command on the second network element.

Optionally, that the EMS executes the second command on the second network element includes: The EMS sends the second command to the second network element.

The second command is obtained by the EMS by translating the first intent.

Step 702: The EMS executes the first command on the first network element.

Optionally, that the EMS executes the first command on the first network element includes: The EMS sends the first command to the first network element.

The first command is obtained by the EMS by translating the first intent.

Optionally, after step 702, the method further includes: The EMS sends first notification information to the NMS.

The first notification information may be used to indicate an execution result of the first intent. The execution result of the first intent may include: The intent is fulfilled (IntentFulfilled).

Figure 7:
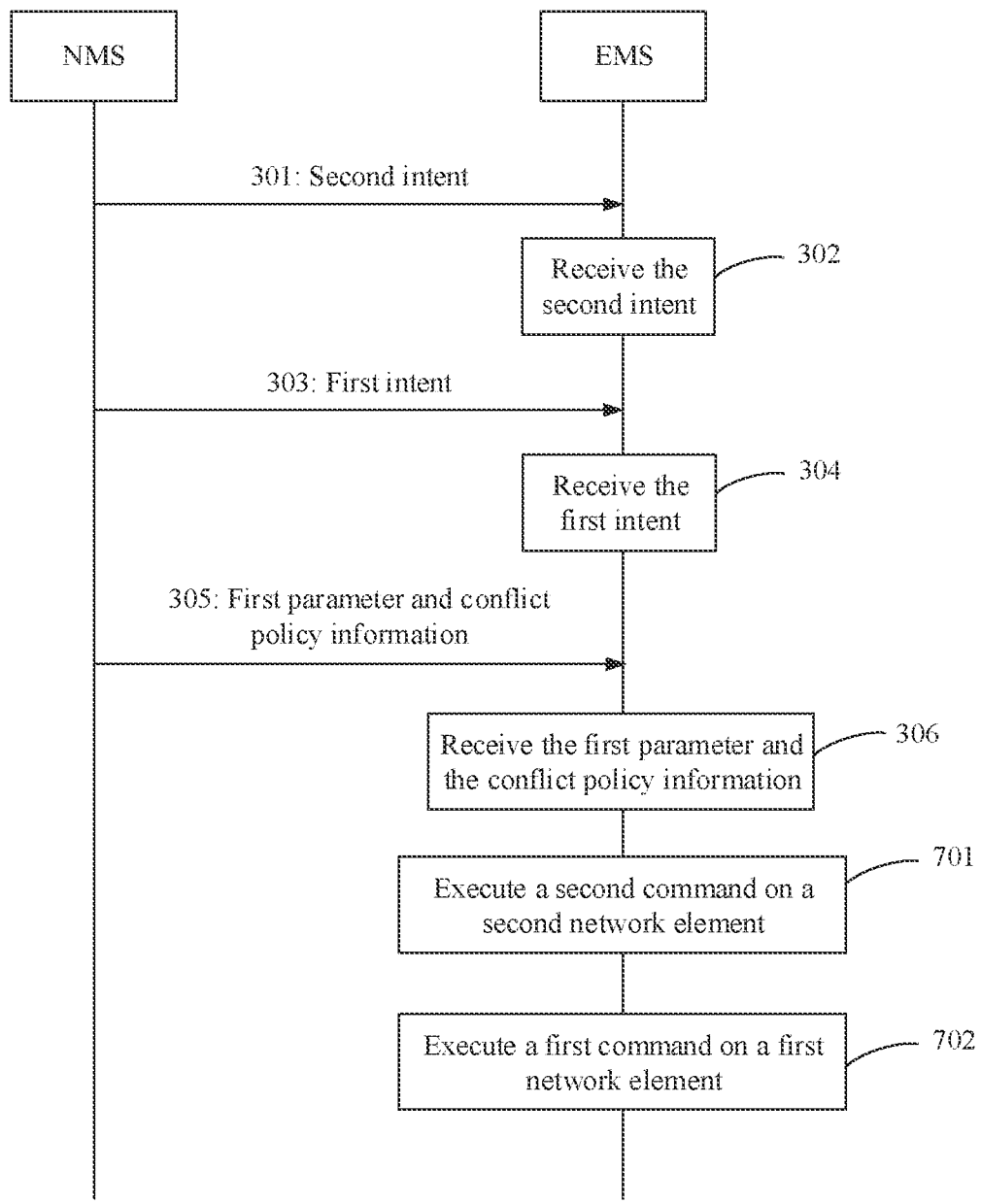
FIG. 7 is a schematic flowchart 4 of an intent execution method according to an embodiment of this application.

Optionally, if the second parameter indicates the EMS is allowed to execute the fourth command on the third network element, the method shown in FIG. 7 further includes: The EMS sends second notification information to the NMS.

The second notification information may be used to indicate an execution result of the second intent. The execution result of the second intent may include: The intent is partially fulfilled.

Based on the third implementation scenario shown in FIG. 3, when the EMS determines that the intent that the EMS preferentially meets is the first intent, the EMS may execute the first command on the first network element, and execute the second command on the second network element. In this way, the EMS fulfills the first intent.

Figure 8:
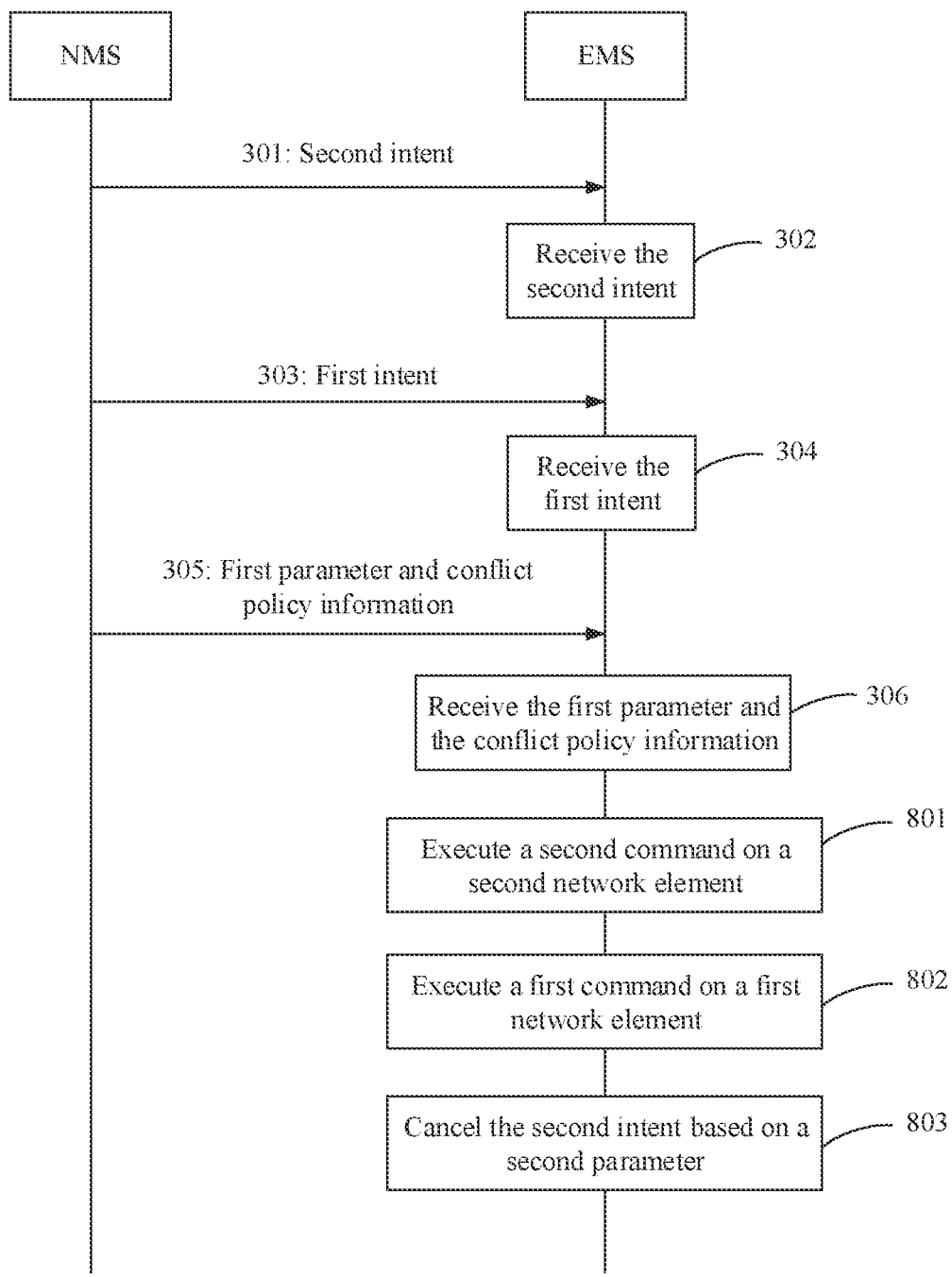
FIG. 8 is a schematic flowchart 5 of an intent execution method according to an embodiment of this application.

Further, optionally, in the fourth implementation scenario of the method shown in FIG. 3, the second intent is further used to indicate the EMS to execute the fourth command on the third network element. When the EMS determines that the intent that the EMS preferentially meets is the first intent, if the second parameter indicates that the EMS is not allowed to execute the fourth command on the third network element, the EMS executes the first command on the first network element, executes the second command on the second network element, and cancels the second intent based on the second parameter. For this process, refer to FIG. 8. In the method shown in FIG. 3, step 307 includes step 801, and step 308 includes step 802. The method shown in FIG. 3 further includes step 803.

Step 801: The EMS executes the second command on the second network element.

Step 802: The EMS executes the first command on the first network element.

For specific processes of step 801 and step 802, refer to corresponding descriptions of step 701 and step 702. Details are not described again.

Step 803: The EMS cancels the second intent based on the second parameter.

The second parameter may indicate that the EMS is not allowed to execute the fourth command on the third network element.

Optionally, that the EMS cancels the second intent includes: The EMS deactivates the second intent or removes the second intent.

Further, optionally, that the EMS deactivates the second intent includes: The NMS sends third request information to the EMS, where the third request information is used to request to deactivate the second intent (deactivateIntent), and includes the identifier of the second intent. The EMS receives the third request information from the NMS, and deactivates the second intent based on the third request information.

Optionally; after deactivating the second intent, the EMS sends third response information to the NMS, where the third response information is used to indicate a deactivation result (for example, the second intent is successfully deactivated or the second intent fails to be deactivated).

It should be noted that, if the deactivation succeeds, the intent is converted from the active state to the inactive state.

Further, optionally, that the EMS removes the second intent includes: The NMS sends fourth request information to the EMS, where the fourth request information is used to request to remove the second intent (removeIntent), and includes the identifier of the second intent. The EMS receives the fourth request information from the NMS, and removes the second intent based on the fourth request information.

Optionally, after removing the second intent, the EMS sends fourth response information to the NMS, where the fourth response information is used to indicate a removal result (for example, the second intent is successfully removed or the second intent fails to be removed).

Optionally, after step 803, the method further includes: The EMS sends second notification information to the NMS.

The second notification information may be used to indicate an execution result of the second intent. The execution result of the second intent may include: An intent conflict occurs (IntentConflict).

Based on the fourth implementation scenario in FIG. 3, when the EMS determines that the intent that the EMS preferentially meets is the first intent, and the second parameter indicates that the EMS is not allowed to execute the fourth command on the third network element, the EMS may execute the first command on the first network element, execute the second command on the second network element, and cancel the second intent based on the second parameter. In this way, the EMS fulfills the first intent, and cancels the second intent.

Further, optionally, in the fifth implementation scenario of the method shown in FIG. 3, if the EMS cannot determine, based on the conflict policy information, the intent that the EMS preferentially meets, the EMS may send intent conflict resolution request information to the NMS, receive intent conflict resolution response information sent by the NMS, and determine, based on the intent conflict resolution response information, the intent that the EMS preferentially meets.

Figure 9:
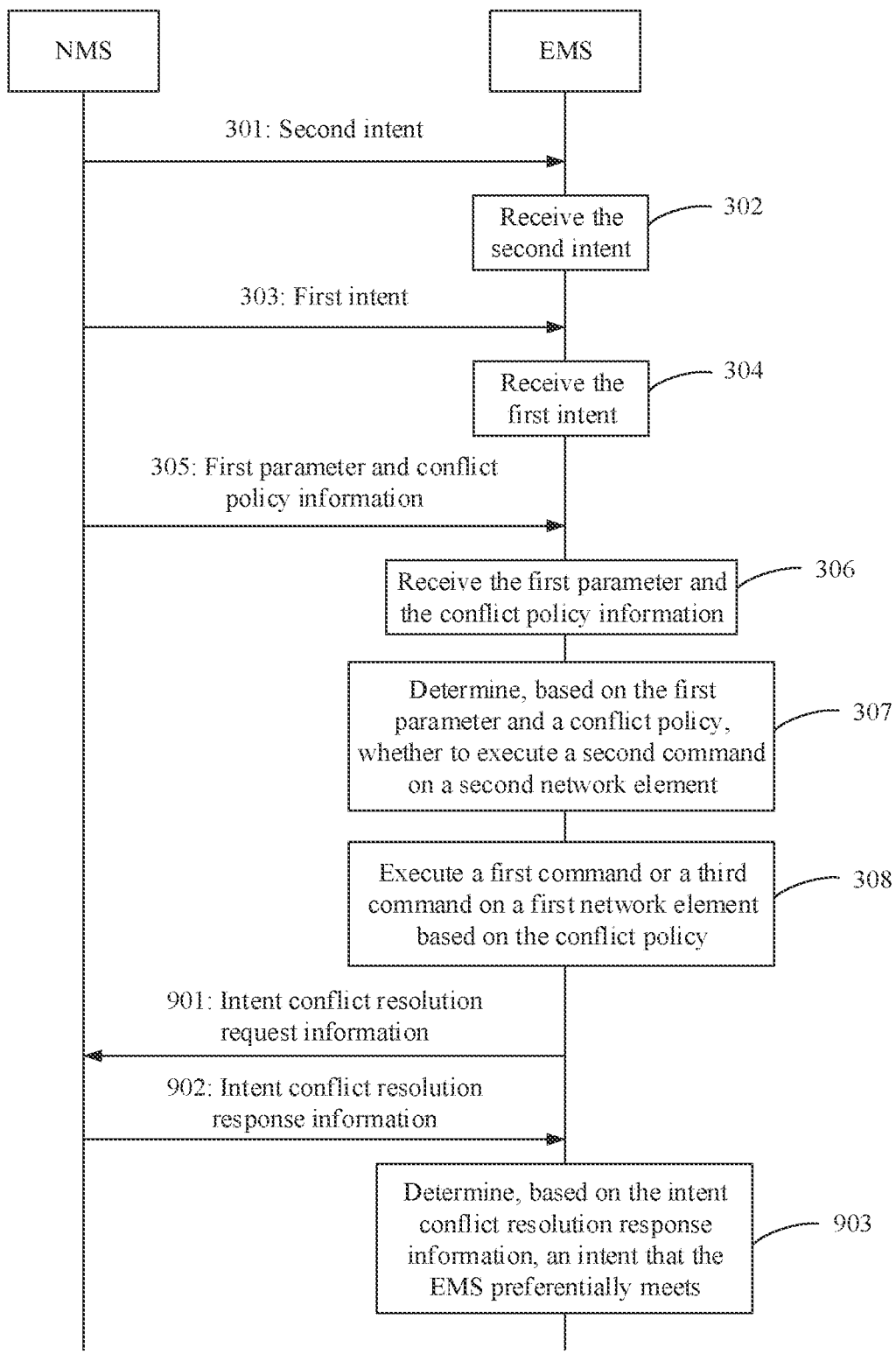
FIG. 9 is a schematic flowchart 6 of an intent execution method according to an embodiment of this application.

As shown in FIG. 9, the method shown in FIG. 3 further includes step 901 to step 903.

Step 901: The EMS sends the intent conflict resolution request information to the NMS.

The intent conflict resolution request information may be used to request to determine the intent that the EMS preferentially meets.

Optionally, the intent conflict resolution request information includes an identifier of a conflicting intent (for example, the identifier of the first intent and/or the identifier of the second intent).

Further, optionally, the intent conflict resolution request information further includes an identifier of a conflicting network element (for example, an identifier of the first network element).

Step 902: The NMS receives the intent conflict resolution request information from the EMS, and sends the intent conflict resolution response information to the EMS.

The intent conflict resolution response information is used to indicate the intent that the EMS preferentially meets.

In some embodiments, the intent conflict resolution response information includes an identifier of the intent that the EMS preferentially meets, for example, the identifier of the first intent or the identifier of the second intent.

In some embodiments, the intent conflict resolution response information includes the identifier of the conflicting network element and an identifier of an intent implemented on the conflicting network element.

In some embodiments, the intent conflict resolution response information includes updated conflict policy information.

In some embodiments, the intent conflict resolution response information includes an updated third parameter.

Step 903: The EMS receives the intent conflict resolution response information from the NMS, and determines, based on the intent conflict resolution response information, the intent that the EMS preferentially meets.

In some embodiments, the intent conflict resolution response information includes the identifier of the intent that the EMS preferentially meets, and that the EMS determines, based on the intent conflict resolution response information, the intent that the EMS preferentially meets includes: The EMS determines, based on the identifier of the intent that the EMS preferentially meets, the intent that the EMS preferentially meets.

For example, the intent conflict resolution response information includes the identifier of the first intent, and the EMS determines that the first intent is the intent that the EMS preferentially meets.

In some embodiments, the intent conflict resolution response information includes the identifier of the conflicting network element and the identifier of the intent implemented on the conflicting network element, and that the EMS determines, based on the intent conflict resolution response information, the intent that the EMS preferentially meets includes: The EMS determines, based on the identifier of the conflicting network element and the identifier of the intent implemented on the conflicting network element, an intent implemented on each conflicting network element.

For example, the intent conflict resolution response information includes {network element 1, intent 1} and {network element 2, intent 2}, where the intent 1 conflicts with the intent 2, and the network element 1 and the network element 2 are the conflicting network elements. In this case, the EMS determines, based on the intent conflict resolution response information, to implement the intent 1 on the network element 1 and implement the intent 2 on the network element 2.

In some embodiments, the intent conflict resolution response information includes the updated conflict policy information, and that the EMS determines, based on the intent conflict resolution response information, the intent that the EMS preferentially meets includes: The EMS determines, based on the updated conflict policy information, the intent that the EMS preferentially meets.

For example, the intent 1 conflicts with the intent 2, and a scope of the intent 1 is larger than a scope of the intent 2. The EMS receives both the intent 1 and the intent 2. The conflict policy information includes policy 2, and the updated conflict policy information includes: determining that, in conflicting intents, an intent having a larger scope is the intent that the EMS preferentially meets. Because the EMS receives both the intent 1 and the intent 2, the EMS cannot determine, according to policy 2, the intent that the EMS preferentially meets. After receiving the intent conflict resolution response information, the EMS may determine, based on the intent conflict resolution response information, that the intent that the EMS preferentially meets is the intent 1.

In some embodiments, the intent conflict resolution response information includes the updated third parameter, and that the EMS determines, based on the intent conflict resolution response information, the intent that the EMS preferentially meets includes: The EMS determines, based on the updated third parameter, the intent that the EMS preferentially meets.

For example, the intent 1 conflicts with the intent 2, and third parameters of the intent 1 and the intent 2 are both 2. The intent conflict resolution response information includes an updated third parameter of the intent 1, and the updated third parameter of the intent 1 is 1. Because the third parameters of the intent 1 and the intent 2 are both 2, the EMS cannot determine the intent that the EMS preferentially meets. After receiving the intent conflict resolution response information, the EMS may determine that a priority of the intent 1 is higher than that of the intent 2 in this case. Therefore, the EMS may determine, based on the intent conflict resolution response information, that the intent that the EMS preferentially meets is the intent 1.

It should be noted that the intent conflict resolution response information is merely an example. The intent conflict resolution response information may further include other content, or the intent conflict resolution response information may be information in another form. This is not limited.

It should be noted that, after determining, based on the intent conflict resolution response information, the intent that the EMS preferentially meets, the EMS may determine, based on the first parameter and the intent that the EMS preferentially meets, whether to execute the second command on the second network element, and determine, based on the intent that the EMS preferentially meets, to execute the first command or the third command on the first network element.

Based on the fifth implementation scenario shown in FIG. 3, if the EMS cannot determine, based on the conflict policy information, the intent that the EMS preferentially meets, the EMS may send the intent conflict resolution request information to the NMS, receive the intent conflict resolution response information sent by the NMS, and determine, based on the intent conflict resolution response information, the intent that the EMS preferentially meets. In this way, the command of the EMS on the network element can be determined.

The NMS and the EMS perform the foregoing intent execution method. In addition, the NMS can further query an intent in the EMS, so that the NMS learns of the intent in the EMS.

Figure 10:
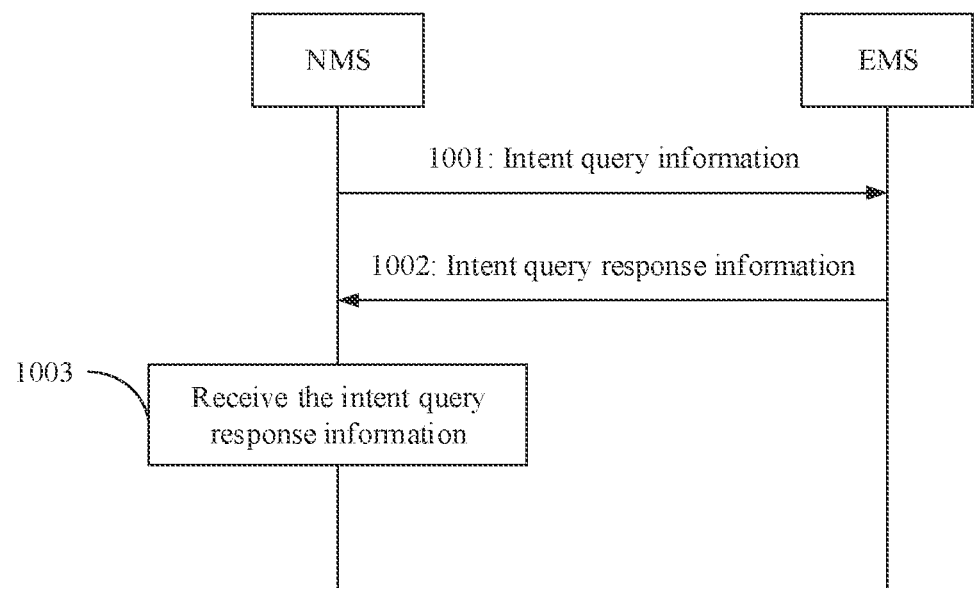
FIG. 10 is a schematic flowchart 7 of an intent execution method according to an embodiment of this application.

FIG. 10 shows another intent execution method according to an embodiment of this application. The intent execution method may include step 1001 to step 1003.

Step 1001: An NMS sends intent query information to an EMS.

The intent query information may be used to query an intent in the EMS.

It should be noted that, during specific implementation, according to query objectives, the intent query information may include different information.

In some embodiments, to query related information of one or more intents in the EMS, the intent query information may include identifiers of the one or more intents.

In some embodiments, to query an intent that is in an active state in the EMS, the intent query information may include information about the active state. The information about the active state may be used to indicate to query the intent that is in the active state.

Optionally, that an NMS sends intent query information to an EMS includes: The NMS invokes an intent query (queryIntent) interface to send the intent query information to the EMS.

Step 1002: The EMS receives the intent query information from the NMS, and sends intent query response information to the NMS.

The intent query response information may include the one or more intents and first parameters of the one or more intents.

The one or more intents may be one or more intents that meet the intent query information. For example, if the intent query information includes an identifier of an intent 1 and an identifier of an intent 2, the intent query response information includes the intent 1, a first parameter of the intent 1, the intent 2, and a first parameter of the intent 2.

The intent may include intent driven action information and intent driven object information.

For specific descriptions of an intent driven action and an intent driven object, refer to the descriptions of the second intent driven action and the second intent driven object in the method shown in FIG. 3. Details are not described again.

The first parameter of the intent may be used to indicate whether the EMS is allowed to execute a command corresponding to the intent on a part of network elements in a scope of the intent. The scope of the intent may be an area identified by an intent driven object property.

For example, the first parameter of the intent may indicate, by using a value of the first parameter of the intent, whether the EMS is allowed to execute the command corresponding to the intent on the part of network elements in the scope of the intent.

For example, the first parameter of the intent may be a Boolean-type parameter. When the value of the first parameter of the intent is true (true), the first parameter of the intent may be used to indicate that the EMS is allowed to execute the command corresponding to the intent on the part of network elements in the scope of the intent; or when the value of the first parameter of the intent is false (false), the first parameter of the intent may indicate that the EMS is not allowed to execute the command corresponding to the intent on the part of network elements in the scope of the intent.

For another example, the first parameter of the intent may perform indication by using a binary bit. When the value of the first parameter of the intent is 1, the first parameter of the intent may be used to indicate that the EMS is allowed to execute the command corresponding to the intent on the part of network elements in the scope of the intent; or when the value of the first parameter of the intent is 0, the first parameter of the intent may indicate that the EMS is not allowed to execute the command corresponding to the intent on the part of network elements in the scope of the intent.

It should be noted that the foregoing descriptions are merely examples of the first parameter of the intent, and the first parameter of the intent may alternatively be a parameter in another form. This is not limited.

In some embodiments, the intent may further include the first parameter of the intent. In this case, the intent query response information may include the one or more intents. For example, the intent includes the intent driven action information and the intent driven object information, the intent driven action information includes an intent driven action name and an intent driven action property, and the intent driven action property includes the first parameter of the intent. For another example, the intent includes the intent driven action information, the intent driven object information, and the first parameter of the intent.

Further, optionally, the intent query response information further includes conflict policy information of the intents.

The conflict policy information of the intent may be used to indicate an intent that the EMS preferentially meets when the intent conflicts with another intent. The intent that the EMS preferentially meets may be an intent that the EMS determines to execute.

Optionally, the conflict policy information of the intent includes one or more of the following policies: policy 1: determining that, in conflicting intents, an intent having a higher priority is the intent that the EMS preferentially meets; policy 2: determining that, in conflicting intents, an intent first received by the EMS or an intent subsequently received by the EMS is the intent that the EMS preferentially meets; or policy 3: determining that, in conflicting intents, an intent having a larger scope or an intent having a smaller scope is the intent that the EMS preferentially meets.

It should be noted that the foregoing policy 1, policy 2, and policy 3 are merely examples of the conflict policy information. During specific implementation, the conflict policy information may further include another policy. This is not limited.

For specific descriptions of the conflict policy information of the intent, refer to the descriptions of the conflict policy information of the first intent in the method shown in FIG. 3. Details are not described again.

Further, optionally, the intent query response information further includes priority information of the intents.

The priority information of the intent may be used to indicate a priority of the intent.

In some embodiments, the intent may further include the priority information of the intent. In this case, the intent query response information includes the one or more intents. For example, the intent includes the intent driven action information and the intent driven object information, the intent driven action information includes an intent driven action name and an intent driven action property, and the intent driven action property includes the priority information of the intent. For another example, the intent includes the intent driven action information, the intent driven object information, and the priority information of the intent.

It should be noted that the intent query response information may further include other information, for example, an intent status, an intent fulfillment status, or an intent query result.

The intent status may include an active state, an inactive state, or an end state.

The intent fulfillment status may include IntentFulfilled (IntentFulfilled), IntentUnfulfilled (Intent Unfulfilled), IntentInfeasible (IntentInfeasible), or IntentConflict (IntentConflict).

The intent query result may include query success, query failure, or the like.

During specific implementation, after receiving the intent query information from the NMS, the EMS may locally query, based on the intent query information, the intent that meets the intent query information, and send, to the NMS, the intent query response information including the intent that meets the intent query information.

Step 1003: The NMS receives the intent query response information from the EMS.

According to the method shown in FIG. 10, the NMS may send the intent query information to the EMS. After receiving the intent query information, the EMS may query, based on the intent query information, the intent that meets the intent query information, and send, to the NMS, the intent query response information including the intent that meets the intent query information. In this way, the NMS learns of the first parameter of the intent in the EMS, the conflict policy information, the priority information of the intent in the EMS, or the like.

The solutions provided in embodiments of this application are mainly described above from a perspective of interaction between apparatuses. It may be understood that, to implement the foregoing functions, the EMS, the NMS, or the like includes a corresponding hardware structure and/or software module for implementing each function. A person skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the EMS or the NMS may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used.

Figure 11:
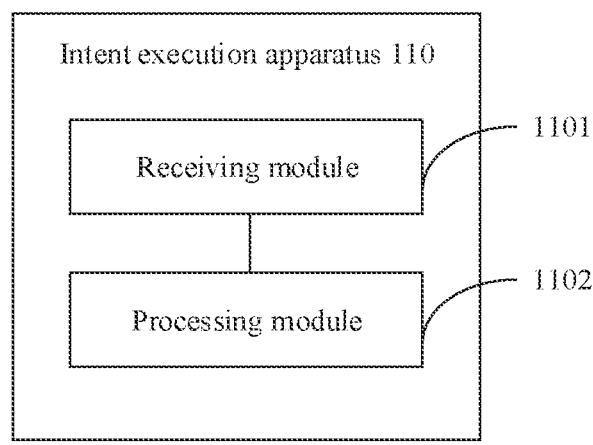
FIG. 11 is a schematic diagram 1 of a structure of an intent execution apparatus according to an embodiment of this application.

For example, when functional modules are obtained through division in an integrated manner, FIG. 11 is a schematic diagram of a structure of an intent execution apparatus 110. The intent execution apparatus 110 may be an EMS, a chip or a system on chip in the EMS, or another combined device, component, or the like that can implement a function of the EMS. The intent execution apparatus 110 may be configured to execute a function of the EMS in the foregoing embodiments.

In a possible implementation, the intent execution apparatus 110 shown in FIG. 11 includes a receiving module 1101 and a processing module 1102.

The receiving module 1101 is configured to receive a first intent from a network management system NMS, where the first intent is used to indicate the EMS to execute a first command on a first network element and execute a second command on a second network element, a second intent in an active state is maintained in the EMS, the second intent is used to indicate the EMS to execute a third command on the first network element, and the first command and the third command are mutually exclusive.

The receiving module 1101 is further configured to receive a first parameter and conflict policy information from the NMS.

The processing module 1102 is configured to determine, based on the first parameter and the conflict policy information, whether to execute the second command on the second network element.

The processing module 1102 is further configured to execute the first command or the third command on the first network element based on the conflict policy information.

Optionally, the receiving module 1101 is further configured to receive the conflict policy information from the NMS.

Optionally, the conflict policy information includes one or more of the following policies: policy 1: determining that, in conflicting intents, an intent having a higher priority is an intent that the EMS preferentially meets; policy 2: determining that, in conflicting intents, an intent first received by the EMS or an intent subsequently received by the EMS is an intent that the EMS preferentially meets; or policy 3: determining that, in conflicting intents, an intent having a larger scope or an intent having a smaller scope is an intent that the EMS preferentially meets.

Optionally, if the intent that the EMS preferentially meets is the second intent, and the first parameter indicates that the EMS is allowed to execute the second command on the second network element, the processing module 1102 is specifically configured to execute the second command on the second network element.

Optionally, if the intent that the EMS preferentially meets is the second intent, the processing module 1102 is specifically configured to execute the third command on the first network element.

Optionally, if the intent that the EMS preferentially meets is the first intent, the processing module 1102 is specifically configured to execute the second command on the second network element; and the processing module 1102 is further specifically configured to execute the first command on the first network element.

Optionally, the second intent is further used to indicate the EMS to execute a fourth command on a third network element. The processing module 1102 is further configured to cancel the second intent based on the second parameter, where the second parameter indicates that the EMS is not allowed to execute the fourth command on the third network element.

Figure 12:
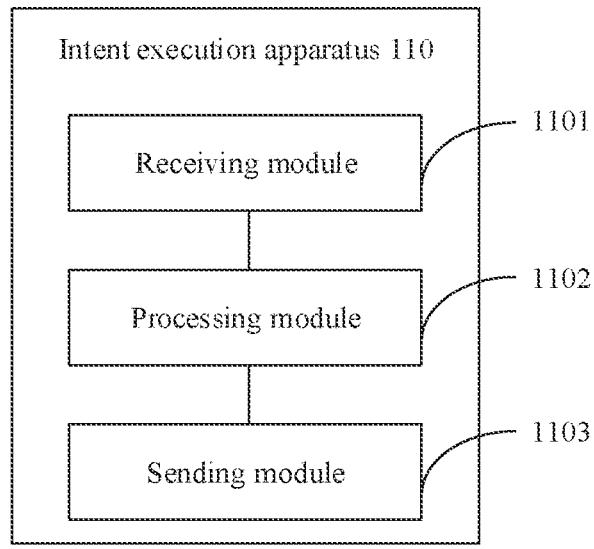
FIG. 12 is a schematic diagram 2 of a structure of an intent execution apparatus according to an embodiment of this application.

Optionally, as shown in FIG. 12, the intent execution apparatus 110 further includes a sending module 1103. The sending module 1103 is configured to send first notification information to the NMS, where the first notification information is used to indicate an execution result of the first intent.

Optionally, the sending module 1103 is configured to send second notification information to the NMS, where the second notification information is used to indicate an execution result of the second intent.

Optionally, the sending module 1103 is configured to send intent conflict resolution request information to the NMS, where the intent conflict resolution request information is used to request to determine the intent that the EMS preferentially meets. The receiving module 1101 is further configured to receive intent conflict resolution response information from the NMS. The processing module 1102 is further configured to determine, based on the intent conflict resolution response information, the intent that the EMS preferentially meets.

Optionally, the intent conflict resolution response information includes an identifier of the first intent or an identifier of the second intent. The processing module 1102 is specifically configured to determine, based on the identifier of the first intent or the identifier of the second intent, the intent that the EMS preferentially meets.

Optionally, the intent conflict resolution response information includes updated conflict policy information. The processing module 1102 is specifically configured to determine, based on the updated conflict policy information, the intent that the EMS preferentially meets.

All related content of the operations in the foregoing method embodiments may be cited in function descriptions of corresponding functional modules, Details are not described herein again.

In this embodiment, the intent execution apparatus 110 is presented in a form of functional modules obtained through division in an integrated manner. The "module" herein may be an ASIC, a circuit, a processor executing one or more software or firmware programs, a memory, an integrated logic circuit, and/or another device that can provide the foregoing function. In a simple embodiment, a person skilled in the art may figure out that the intent execution apparatus 110 may be in a form shown in FIG. 2.

For example, the processor 201 in FIG. 2 may invoke the computer-executable instructions stored in the memory 203, to enable the intent execution apparatus 110 to perform the intent execution method in the foregoing method embodiments.

For example, functions/implementation processes of the receiving module 1101, the processing module 1102, and the sending module 1103 in FIG. 12 may be implemented by the processor 201 in FIG. 2 by invoking the computer-executable instructions stored in the memory 203. Alternatively, a function/an implementation process of the processing module 1102 in FIG. 12 may be implemented by the processor 201 in FIG. 2 by invoking the computer-executable instructions stored in the memory 203, and functions/implementation processes of the receiving module 1101 and the sending module 1103 in FIG. 12 may be implemented by the communication interface 204 in FIG. 2.

The intent execution apparatus 110 provided in this embodiment can perform the foregoing intent execution method. Therefore, for technical effects that can be achieved by the intent execution apparatus 110, refer to the foregoing method embodiments. Details are not described herein again.

Figure 13:
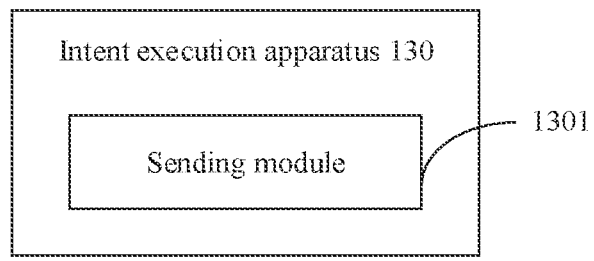
FIG. 13 is a schematic diagram 3 of a structure of an intent execution apparatus according to an embodiment of this application.

For example, when functional modules are obtained through division in an integrated manner, FIG. 13 is a schematic diagram of a structure of an intent execution apparatus 130. The intent execution apparatus 130 may be an NMS, a chip or a system on chip in the NMS, or another combined device, component, or the like that can implement a function of the NMS. The intent execution apparatus 130 may be configured to execute a function of the NMS in the foregoing embodiments.

In a possible implementation, the intent execution apparatus 130 shown in FIG. 13 includes a sending module 1301.

The sending module 1301 is configured to send a second intent to an element management system EMS, where the second intent is used to indicate the EMS to execute a third command on a first network element.

The sending module 1301 is configured to send a first intent to the EMS, where the first intent is used to indicate the EMS to execute a first command on the first network element and execute a second command on a second network element, and the first command and the third command are mutually exclusive.

The sending module 1301 is further configured to send a first parameter and conflict policy information to the EMS, where the first parameter and the conflict policy information are used to determine whether to execute the second command on the second network element, and the conflict policy information is further used to determine to execute the first command or the third command on the first network element.

Optionally, the conflict policy information includes one or more of the following policies: policy 1: determining that, in conflicting intents, an intent having a higher priority is an intent that the EMS preferentially meets; policy 2: determining that, in conflicting intents, an intent first received by the EMS or an intent subsequently received by the EMS is an intent that the EMS preferentially meets; or policy 3: determining that, in conflicting intents, an intent having a larger scope or an intent having a smaller scope is an intent that the EMS preferentially meets.

Figure 14:
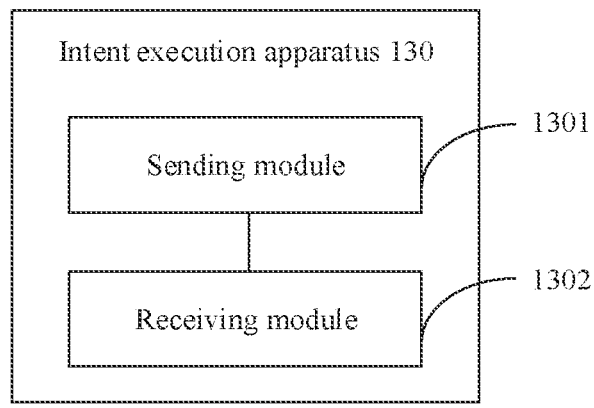
FIG. 14 is a schematic diagram 4 of a structure of an intent execution apparatus according to an embodiment of this application.

Optionally, as shown FIG. 14, the intent execution apparatus 130 further includes a receiving module 1302. The receiving module 1302 is configured to receive first notification information from the EMS, where the first notification information is used to indicate that the first intent conflicts with another intent.

Optionally, the receiving module 1302 is configured to receive second notification information from the EMS, where the second notification information is used to indicate an execution result of the second intent.

Optionally, the receiving module 1302 is configured to receive intent conflict resolution request information from the EMS, where the intent conflict resolution request information is used to request to determine the intent that the EMS preferentially meets. The sending module 1301 is further configured to send intent conflict resolution response information to the EMS, where the intent conflict resolution response information is used to indicate the intent that the EMS preferentially meets.

Optionally, the intent conflict resolution response information includes an identifier of the first intent or an identifier of the second intent, the second intent is an intent that is in an active state and that is maintained in the EMS, the second intent is used to indicate the EMS to execute the third command on the first network element, and the first command and the third command are mutually exclusive; or the intent conflict resolution response information includes updated conflict policy information, and the conflict policy information is used to indicate the intent that the EMS preferentially meets when the first intent conflicts with another intent.

All related content of the operations in the foregoing method embodiments may be cited in function descriptions of corresponding functional modules. Details are not described, herein again.

In this embodiment, the intent execution apparatus 130 is presented in a form of functional modules obtained through division in an integrated manner. The "module" herein may be an ASIC, a circuit, a processor executing one or more software or firmware programs, a memory, an integrated logic circuit, and/or another device that can provide the foregoing function. In a simple embodiment, a person skilled in the art may figure out that the intent execution apparatus 130 may be in a form shown in FIG. 2.

For example, the processor 201 in FIG. 2 may invoke the computer-executable instructions stored in the memory 203, to enable the intent execution apparatus 130 to perform the intent execution method in the foregoing method embodiments.

For example, functions/implementation processes of the sending module 1301 and the receiving module 1302 in FIG. 14 may be implemented by the processor 201 in FIG. 2 by invoking the computer-executable instructions stored in the memory 203. Alternatively, functions/implementation processes of the sending module 1301 and the receiving module 1302 in FIG. 14 may be implemented by the communication interface 204 in FIG. 2.

The intent execution apparatus 130 provided in this embodiment can perform the foregoing intent execution method, Therefore, for technical effects that can be achieved by the intent execution apparatus 130, refer to the foregoing method embodiments. Details are not described herein again.

Figure 15:
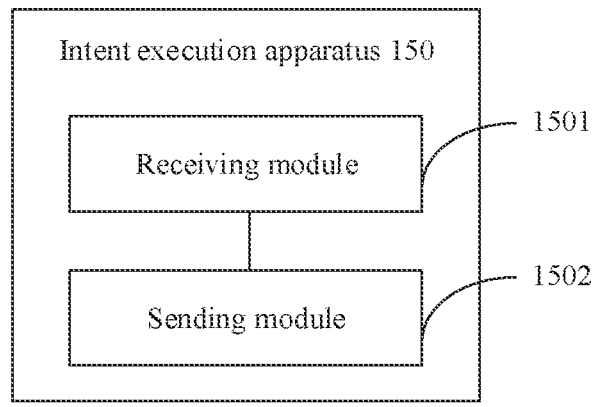
FIG. 15 is a schematic diagram 5 of a structure of an intent execution apparatus according to an embodiment of this application.

For example, when functional modules are obtained through division in an integrated manner, FIG. 15 is a schematic diagram of a structure of an intent execution apparatus 150. The intent execution apparatus 150 may be an EMS, a chip or a system on chip in the EMS, or another combined device, component, or the like that can implement a function of the EMS. The intent execution apparatus 150 may be configured to execute a function of the EMS in the foregoing embodiments.

In a possible implementation, the intent execution apparatus 150 shown in FIG. 15 includes a receiving module 1501 and a sending module 1502.

The receiving module 1501 is configured to receive intent query information from an NMS, where the intent query information is used to query an intent in the intent execution apparatus 150.

The sending module 1502 is configured to send intent query response information to the NMS, where the intent query response information includes one or more intents and first parameters of the one or more intents. The first parameter of the intent is used to indicate whether the intent execution apparatus 150 is allowed to execute a command corresponding to the intent on a part of network elements in a scope of the intent.

Optionally, the intent query response information further includes conflict policy information of the intents. The conflict policy information of the intent is used to indicate an intent that the intent execution apparatus 150 preferentially meets when the intent conflicts with another intent.

Optionally; the conflict policy information of the intent includes one or more of the following policies: policy 1: determining that, in conflicting intents, an intent having a higher priority is the intent that the intent execution apparatus 150 preferentially meets; policy 2: determining that, in conflicting intents, an intent first received by the intent execution apparatus 150 or an intent subsequently received by the intent execution apparatus 150 is the intent that the intent execution apparatus 150 preferentially meets: or policy 3: determining that, in conflicting intents, an intent having a larger scope or an intent having a smaller scope is the intent that the intent execution apparatus 150 preferentially meets.

All related content of the operations in the foregoing method embodiments may be cited in function descriptions of corresponding functional modules. Details are not described herein again.

In this embodiment, the intent execution apparatus 150 is presented in a form of functional modules obtained through division in an integrated manner. The "module" herein may be an ASIC, a circuit, a processor executing one or more software or firmware programs, a memory, an integrated logic circuit, and/or another device that can provide the foregoing function. In a simple embodiment, a person skilled in the art may figure out that the intent execution apparatus 150 may be in a form shown in FIG. 2.

For example, the processor 201 in FIG. 2 may invoke the computer-executable instructions stored in the memory 203, to enable the intent execution apparatus 150 to perform the intent execution method in the foregoing method embodiments.

For example, functions/implementation processes of the receiving module 1501 and the sending module 1502 in FIG. 15 may be implemented by the processor 201 in FIG. 2 by invoking the computer-executable instructions stored in the memory 203. Alternatively, functions/implementation processes of the receiving module 1501 and the sending module 1502 in FIG. 15 may be implemented by the communication interface 204 in FIG. 2.

The intent execution apparatus 150 provided in this embodiment can perform the foregoing intent execution method. Therefore, for technical effects that can be achieved by the intent execution apparatus 150, refer to the foregoing method embodiments. Details are not described herein again.

Figure 16:
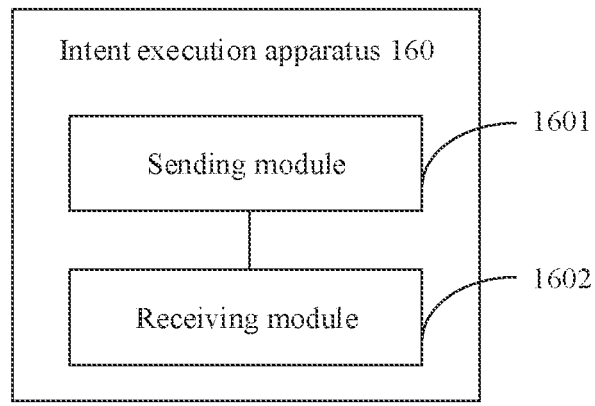
FIG. 16 is a schematic diagram 6 of a structure of an intent execution apparatus according to an embodiment of this application.

For example, when functional modules are obtained through division in an integrated manner, FIG. 16 is a schematic diagram of a structure of an intent execution apparatus 160. The intent execution apparatus 160 may be an NMS, a chip or a system on chip in the NMS, or another combined device, component, or the like that can implement a function of the NMS. The intent execution apparatus 160 may be configured to execute a function of the NMS in the foregoing embodiments.

In a possible implementation, the intent execution apparatus 160 shown in FIG. 16 includes a sending module 1601 and a receiving module 1602.

The sending module 1601 is configured to send intent query information to an element management system EMS, where the intent query information is used to query an intent in the EMS.

The receiving module 1602 is configured to receive intent query response information from the EMS, where the intent query response information includes one or more intents and first parameters of the one or more intents. The first parameter of the intent is used to indicate whether the EMS is allowed to execute a command corresponding to the intent on a part of network elements in a scope of the intent.

Optionally, the intent query response information further includes conflict policy information of the intents. The conflict policy information of the intent is used to indicate an intent that the EMS preferentially meets when the intent conflicts with another intent.

Optionally, the conflict policy information of the intent includes one or more of the following policies: policy 1: determining that, in conflicting intents, an intent having a higher priority is the intent that the EMS preferentially meets policy 2: determining that, in conflicting intents, an intent first received by the EMS or an intent subsequently received by the EMS is the intent that the EMS preferentially meets; or policy 3: determining that, in conflicting intents, an intent having a larger scope or an intent having a smaller scope is the intent that the EMS preferentially meets.

All related content of the operations in the foregoing method embodiments may be cited in function descriptions of corresponding functional modules. Details are not described herein again.

In this embodiment, the intent execution apparatus 160 is presented in a form of functional modules obtained through division in an integrated manner. The "module" herein may be an ASIC, a circuit, a processor executing one or more software or firmware programs, a memory, an integrated logic circuit, and/or another device that can provide the foregoing function. In a simple embodiment, a person skilled in the art may figure out that the intent execution apparatus 160 may be in a form shown in FIG. 2.

For example, the processor 201 in FIG. 2 may invoke the computer-executable instructions stored in the memory 203, to enable the intent execution apparatus 160 to perform the intent execution method in the foregoing method embodiments.

For example, functions/implementation processes of the sending module 1601 and the receiving module 1602 in FIG. 16 may be implemented by the processor 201 in FIG. 2 by invoking the computer-executable instructions stored in the memory 203. Alternatively, functions/implementation processes of the sending module 1601 and the receiving module 1602 in FIG. 16 may be implemented by the communication interface 204 in FIG. 2.

The intent execution apparatus 160 provided in this embodiment can perform the foregoing intent execution method. Therefore, for technical effects that can be achieved by the intent execution apparatus 160, refer to the foregoing method embodiments. Details are not described herein again.

Figure 17:
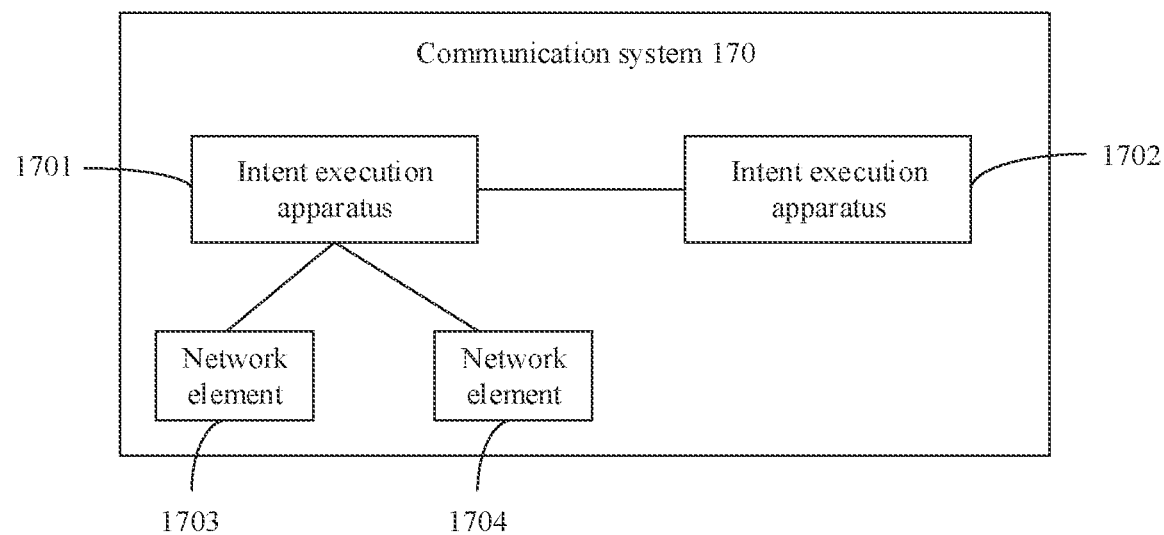
FIG. 17 is a schematic composition diagram a communication system according to an embodiment of this application.

FIG. 17 is a schematic composition diagram of a communication system. As shown in FIG. 17, the communication system 170 may include an intent execution apparatus 1701, an intent execution apparatus 1702, a network element 1703, and a network element 1704. It should be noted that FIG. 17 is merely an example of an accompanying drawing. Apparatuses included in the communication system 170 shown in FIG. 17 and a quantity of the network elements are not limited in this embodiment of this application.

The intent execution apparatus 1701 may have a function of the intent execution apparatus 110 shown in FIG. 11 or FIG. 12 and/or a function of the intent execution apparatus 150 shown in FIG. 15.

The intent execution apparatus 1702 may have a function of the intent execution apparatus 130 shown in FIG. 13 or FIG. 14 and/or a function of the intent execution apparatus 160 shown in FIG. 16.

The network element 1703 or the network element 1704 may be configured to execute a command of the intent execution apparatus 1701.

It should be noted that all related content of the steps in the foregoing method embodiments may be cited in function descriptions of corresponding apparatuses of the communication system 170. Details are not described herein again.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a. DVD), a semiconductor medium (for example, a solid-state drive solid-state disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, the term "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and embodiments thereof, it is clear that various modifications and combinations may be made to this application without departing from the scope of this application. Correspondingly, the specification and the accompanying drawings are merely example descriptions in this application defined by the appended claims, and are intended to cover any of or all modifications, variations, combinations, or equivalents within the scope of this application. It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. An intent execution method, wherein the method comprises:
receiving, by an element management system (EMS), a first intent from a network management system (NMS), wherein the first intent indicates the EMS to execute a first command on a first network element and execute a second command on a second network element, a second intent in an active state is maintained in the EMS, the second intent indicates the EMS to execute a third command on the first network element, and the first command and the third command are mutually exclusive;
receiving, by the EMS, a first parameter and conflict policy information from the NMS;
determining, by the EMS based on the first parameter and the conflict policy information, whether to execute the second command on the second network element; and
executing, by the EMS, the first command or the third command on the first network element based on the conflict policy information.

2. The method according to claim 1, wherein the conflict policy information comprises one or more of the following policies:
policy 1: determining that, in conflicting intents, an intent having a higher priority is an intent that the EMS preferentially meets;
policy 2: determining that, in conflicting intents, an intent first received by the EMS or an intent subsequently received by the EMS is an intent that the EMS preferentially meets; or
policy 3: determining that, in conflicting intents, an intent having a larger scope or an intent having a smaller scope is an intent that the EMS preferentially meets.

3. The method according to claim 1, wherein if an intent that the EMS preferentially meets is the second intent, and the first parameter indicates that the EMS is allowed to execute the second command on the second network element, the determining, by the EMS based on the first parameter and the conflict policy information, whether to execute the second command on the second network element comprises:
executing, by the EMS, the second command on the second network element.

4. The method according to claim 1, wherein if an intent that the EMS preferentially meets is the second intent, the executing, by the EMS, the first command or the third command on the first network element based on the conflict policy information comprises:
executing, by the EMS, the third command on the first network element.

5. The method according to claim 1, wherein if an intent that the EMS preferentially meets is the first intent,
the determining, by the EMS based on the first parameter and the conflict policy information, whether to execute the second command on the second network element comprises:
executing, by the EMS, the second command on the second network element; and
the executing, by the EMS, the first command or the third command on the first network element based on the conflict policy information comprises:
executing, by the EMS, the first command on the first network element.

6. The method according to claim 5, wherein the second intent further indicates the EMS to execute a fourth command on a third network element, and the method further comprises:
canceling, by the EMS, the second intent based on a second parameter, wherein the second parameter indicates that the EMS is not allowed to execute the fourth command on the third network element.

7. The method according to claim 1, wherein the method further comprises:
sending, by the EMS, first notification information to the NMS, wherein the first notification information indicates an execution result of the first intent.

8. The method according to claim 1, wherein the method further comprises:
sending, by the EMS, second notification information to the NMS, wherein the second notification information indicates an execution result of the second intent.

9. The method according to claim 1, wherein the method further comprises:
- sending, by the EMS, intent conflict resolution request information to the NMS, wherein the intent conflict resolution request information is used to request to determine an intent that the EMS preferentially meets;
- receiving, by the EMS, intent conflict resolution response information from the NMS; and
- determining, by the EMS based on the intent conflict resolution response information, the intent that the EMS preferentially meets.

10. The method according to claim 9, wherein the intent conflict resolution response information comprises an identifier of the first intent or an identifier of the second intent, and the determining, by the EMS based on the intent conflict resolution response information, the intent that the EMS preferentially meets comprises:
- determining, by the EMS based on the identifier of the first intent or the identifier of the second intent, the intent that the EMS preferentially meets.

11. The method according to claim 9, wherein the intent conflict resolution response information comprises updated conflict policy information, and the determining, by the EMS based on the intent conflict resolution response information, the intent that the EMS preferentially meets comprises:
- determining, by the EMS based on the updated conflict policy information, the intent that the EMS preferentially meets.

12. An intent execution method, wherein the method comprises:
- sending, by a network management system (NMS), a second intent to an element management system (EMS), wherein the second intent indicates the EMS to execute a third command on a first network element;
- sending, by the NMS, a first intent to the EMS, wherein the first intent indicates the EMS to execute a first command on the first network element and execute a second command on a second network element, and the first command and the third command are mutually exclusive; and
- sending, by the NMS, a first parameter and conflict policy information to the EMS, wherein the first parameter and the conflict policy information are used to determine whether to execute the second command on the second network element, and the conflict policy information is further used to determine to execute the first command or the third command on the first network element.

13. The method according to claim 12, wherein the conflict policy information comprises one or more of the following policies:
- policy 1: determining that, in conflicting intents, an intent having a higher priority is an intent that the EMS preferentially meets;
- policy 2: determining that, in conflicting intents, an intent first received by the EMS or an intent subsequently received by the EMS is an intent that the EMS preferentially meets; or
- policy 3: determining that, in conflicting intents, an intent having a larger scope or an intent having a smaller scope is an intent that the EMS preferentially meets.

14. The method according to claim 12, wherein the method further comprises:
- receiving, by the NMS, first notification information from the EMS, wherein the first notification information indicates an execution result of the first intent.

15. The method according to claim 12, wherein the method further comprises:
- receiving, by the NMS, second notification information from the EMS, wherein the second notification information indicates an execution result of the second intent.

16. The method according to claim 12, wherein the method further comprises:
- receiving, by the NMS, intent conflict resolution request information from the EMS, wherein the intent conflict resolution request information is used to request to determine an intent that the EMS preferentially meets; and
- sending, by the NMS, intent conflict resolution response information to the EMS, wherein the intent conflict resolution response information indicates the intent that the EMS preferentially meets.

17. The method according to claim 16, wherein:
- the intent conflict resolution response information comprises an identifier of the first intent or an identifier of the second intent, the second intent is an intent that is in an active state and that is maintained in the EMS, the second intent indicates the EMS to execute the third command on the first network element, and the first command and the third command are mutually exclusive; or
- the intent conflict resolution response information comprises updated conflict policy information, and the conflict policy information indicates the intent that the EMS preferentially meets when the first intent conflicts with another intent.

18. An intent execution apparatus, wherein the intent execution apparatus comprises at least one processor and a memory, wherein the memory stores program instructions for execution by the at least one processor to perform operations comprising:
- receiving a first intent from a network management system (NMS), wherein the first intent indicates the intent execution apparatus to execute a first command on a first network element and execute a second command on a second network element, a second intent in an active state is maintained in the intent execution apparatus, the second intent indicates the intent execution apparatus to execute a third command on the first network element, and the first command and the third command are mutually exclusive;
- receiving a first parameter and conflict policy information from the NMS;
- determining, based on the first parameter and the conflict policy information, whether to execute the second command on the second network element; and
- executing the first command or the third command on the first network element based on the conflict policy information.

19. An intent execution apparatus, wherein the intent execution apparatus comprises at least one processor and a memory, wherein the memory stores program instructions for execution by the at least one processor to perform operations comprising:
- sending a second intent to an element management system (EMS), wherein the second intent indicates the EMS to execute a third command on a first network element;
- sending a first intent to the EMS, wherein the first intent indicates the EMS to execute a first command on the first network element and execute a second command on a second network element, and the first command and the third command are mutually exclusive; and sending a first parameter and conflict policy information to the EMS, wherein the first parameter and the conflict policy information are used to determine whether to execute the second command on the second network element, and the conflict policy information is further used to determine to execute the first command or the third command on the first network element.

20. The intent execution apparatus according to claim 19, wherein the operations further comprise:

receiving first notification information from the EMS, wherein the first notification information indicates an execution result of the first intent.

\* \* \* \* \*